US011620233B1

(12) United States Patent
Habusha et al.

(10) Patent No.: US 11,620,233 B1
(45) Date of Patent: Apr. 4, 2023

(54) MEMORY DATA MIGRATION HARDWARE

(71) Applicant: Amazon Technologies, Inc., Seattle, WA (US)

(72) Inventors: Adi Habusha, Moshav Alonei Abba (IL); Ali Ghassan Saidi, Austin, TX (US); Tzachi Zidenberg, Kiryat Tivon (IL)

(73) Assignee: Amazon Technologies, Inc., Seattle, WA (US)

( * ) Notice: Subject to any disclaimer, the term of this patent is extended or adjusted under 35 U.S.C. 154(b) by 48 days.

(21) Appl. No.: 16/588,898

(22) Filed: Sep. 30, 2019

(51) Int. Cl.
- *G06F 12/00* (2006.01)
- *G06F 12/1009* (2016.01)
- *G06F 12/1027* (2016.01)
- *G06F 12/0891* (2016.01)
- *G06F 3/06* (2006.01)
- *G06F 9/30* (2018.01)

(52) U.S. Cl.
CPC ........ *G06F 12/1009* (2013.01); *G06F 3/0614* (2013.01); *G06F 3/0647* (2013.01); *G06F 3/0679* (2013.01); *G06F 9/30047* (2013.01); *G06F 12/0891* (2013.01); *G06F 12/1027* (2013.01); *G06F 2212/7201* (2013.01)

(58) Field of Classification Search
CPC .. G06F 12/1009; G06F 3/0614; G06F 3/0647; G06F 3/0679; G06F 9/30047; G06F 12/0891; G06F 12/1027; G06F 2212/7201
See application file for complete search history.

(56) References Cited

U.S. PATENT DOCUMENTS

| | | | | |
|---|---|---|---|---|
| 7,434,003 B2* | 10/2008 | Oney | ............... | G06F 21/53 711/135 |
| 7,707,151 B1* | 4/2010 | Blumenau | ............ | G06F 11/1438 712/225 |
| 8,898,394 B2* | 11/2014 | Kondo | ................. | G06F 3/0649 711/143 |
| 9,400,611 B1* | 7/2016 | Raizen | ............... | H04L 67/1097 |
| 9,485,308 B2* | 11/2016 | Eisler | ................. | H04L 67/1095 |
| 9,942,323 B2* | 4/2018 | Vasetsky | ............ | G06F 12/0862 |
| 10,216,212 B1* | 2/2019 | Gutierrez | ................. | G05F 1/66 |
| 11,016,954 B1* | 5/2021 | Babocichin | ........... | G06F 16/258 |
| 2002/0108017 A1* | 8/2002 | Kenchammana-Hoskote | ............ | G06F 12/0804 711/E12.04 |
| 2008/0155168 A1* | 6/2008 | Sheu | .................... | G06F 12/1027 711/6 |
| 2009/0125678 A1* | 5/2009 | Tokuda | ................... | G06F 3/067 711/202 |

(Continued)

*Primary Examiner* — Shawn X Gu
*Assistant Examiner* — Mohammad S Hasan
(74) *Attorney, Agent, or Firm* — Weaver Austin Villeneuve & Sampson LLP

(57) ABSTRACT

An integrated circuit for offloading a page migration operation from a host processor is provided. The integrated circuit is configured to: receive, from the host processor, a request to perform the page migration operation from a first physical address to a second physical address; and based on the request, perform the page migration operation. The page migration operation comprises: performing a copy operation of data from the first physical address to the second physical address, and updating a page table entry based on the second physical address, to enable the host processor to access the data from the second physical address based on the updated page table entry.

20 Claims, 13 Drawing Sheets

(56) References Cited

U.S. PATENT DOCUMENTS

| | | | |
|---|---|---|---|
| 2009/0282273 A1* | 11/2009 | Hamilton, II | G06F 1/3203 713/320 |
| 2009/0307426 A1* | 12/2009 | Galloway | G06F 3/0619 711/114 |
| 2010/0121992 A1* | 5/2010 | Chen | G06F 11/1441 711/E12.019 |
| 2012/0137098 A1* | 5/2012 | Wang | G06F 3/0647 711/E12.002 |
| 2013/0086272 A1* | 4/2013 | Chen | G06F 9/4856 709/226 |
| 2013/0326183 A1* | 12/2013 | Bavishi | G06F 3/067 711/165 |
| 2013/0346725 A1* | 12/2013 | Lomet | G06F 16/2246 711/206 |
| 2014/0160844 A1* | 6/2014 | Lin | G11C 29/04 365/185.04 |
| 2014/0281110 A1* | 9/2014 | Duluk, Jr. | G06F 12/123 711/135 |
| 2014/0337585 A1* | 11/2014 | Grisenthwaite | G06F 12/1475 711/152 |
| 2015/0095443 A1* | 4/2015 | Yang | G06F 9/45558 709/212 |
| 2015/0350315 A1* | 12/2015 | Eisler | G06F 3/0614 709/219 |
| 2016/0085585 A1* | 3/2016 | Chen | G06F 12/08 711/205 |
| 2016/0179435 A1* | 6/2016 | Haley | G06F 3/0665 711/162 |
| 2016/0306741 A1* | 10/2016 | Lam | G06F 12/10 |
| 2016/0342363 A1* | 11/2016 | Krause | G06F 3/0683 |
| 2016/0344810 A1* | 11/2016 | Das | G06F 3/0617 |
| 2017/0192686 A1* | 7/2017 | Niu | G06F 3/0644 |
| 2018/0150335 A1* | 5/2018 | Doi | G06F 11/3037 |
| 2018/0213036 A1* | 7/2018 | Vasetsky | H04L 41/082 |
| 2018/0268046 A1* | 9/2018 | Xiong | G06F 16/2272 |
| 2018/0314436 A1* | 11/2018 | Basu | G06F 12/1009 |
| 2018/0365167 A1* | 12/2018 | Eckert | G06F 12/1036 |
| 2019/0068557 A1* | 2/2019 | Noel | G06F 21/602 |
| 2019/0369899 A1* | 12/2019 | Tanpairoj | G06F 1/324 |
| 2019/0377688 A1* | 12/2019 | Basu | G06F 9/542 |
| 2020/0004669 A1* | 1/2020 | Jung | G06F 3/0679 |
| 2020/0211152 A1* | 7/2020 | Benthin | G06F 12/0875 |
| 2021/0073037 A1* | 3/2021 | Arora | G11C 11/406 |
| 2022/0043770 A1* | 2/2022 | Yuan | G06F 15/8076 |

\* cited by examiner

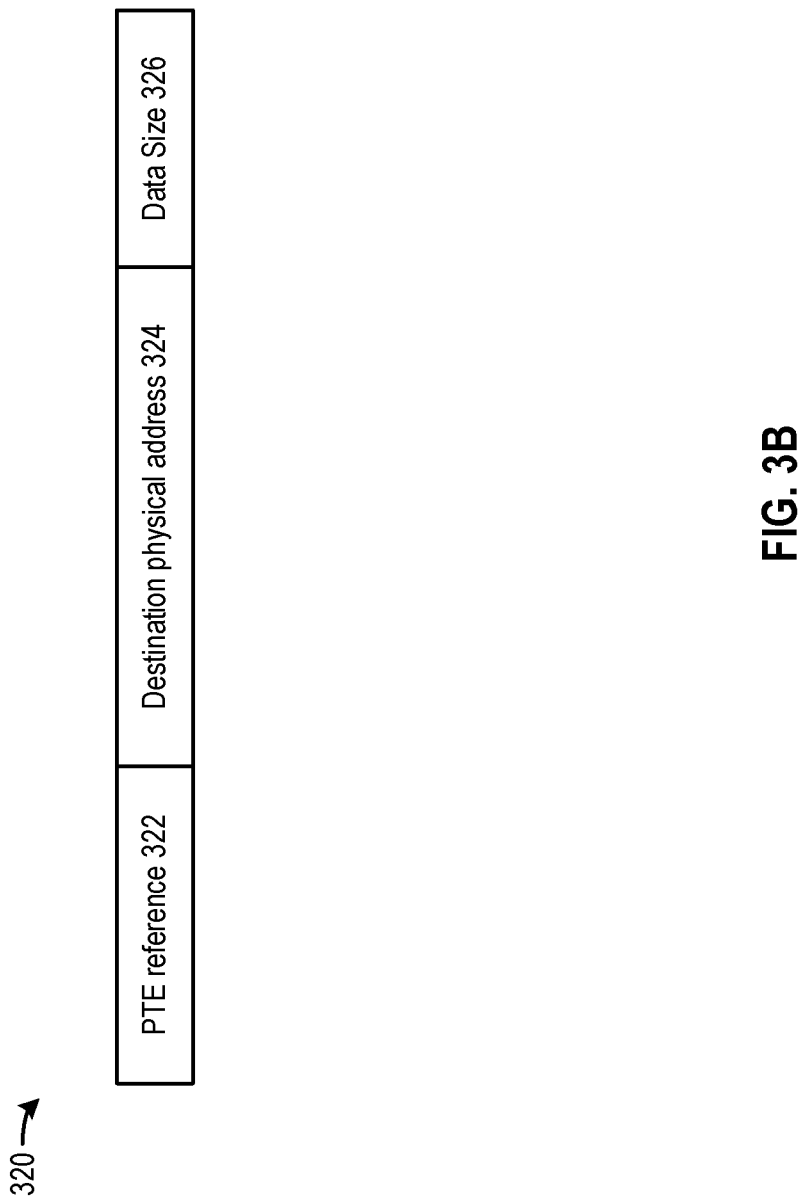

MEMORY DATA MIGRATION HARDWARE

BACKGROUND

In a computing system, a data migration process between memory devices can be performed for various reasons. For example, the data migration process can be executed to balance the write operations among the different memory devices, to move data away from a potentially faulty memory device, to reserve high performance memory devices for certain applications/users, etc. As another example, the migration of data can be part of a virtual machine migration operation to move the virtual machine from a first host to a second host, to support change in workload, server maintenance, faulty server, disaster recovery, etc. The data can be migrated from a first memory accessible to the first host to a second memory accessible to the second host. In all these examples, a data migration process can be performed between memory devices of the same type or between different types of memory devices.

A data migration process in a computing system typically involves a number of operations including, for example, memory access operations to transfer the data between the memory devices, updating of memory address translation data to reflect the migration of data to a new memory address, etc. In a case where the migration is performed by execution of software instructions by a central processing unit (CPU), the operations involved may pose a significant burden to the CPU and use up computing resources that are needed for other computing tasks.

BRIEF DESCRIPTION OF THE DRAWINGS

Various embodiments in accordance with the present disclosure will be described with reference to the drawings, in which:

FIG. 3A and FIG. 3B illustrate example internal components of the hardware component of FIG. 2;

DETAILED DESCRIPTION

Figure 1A:
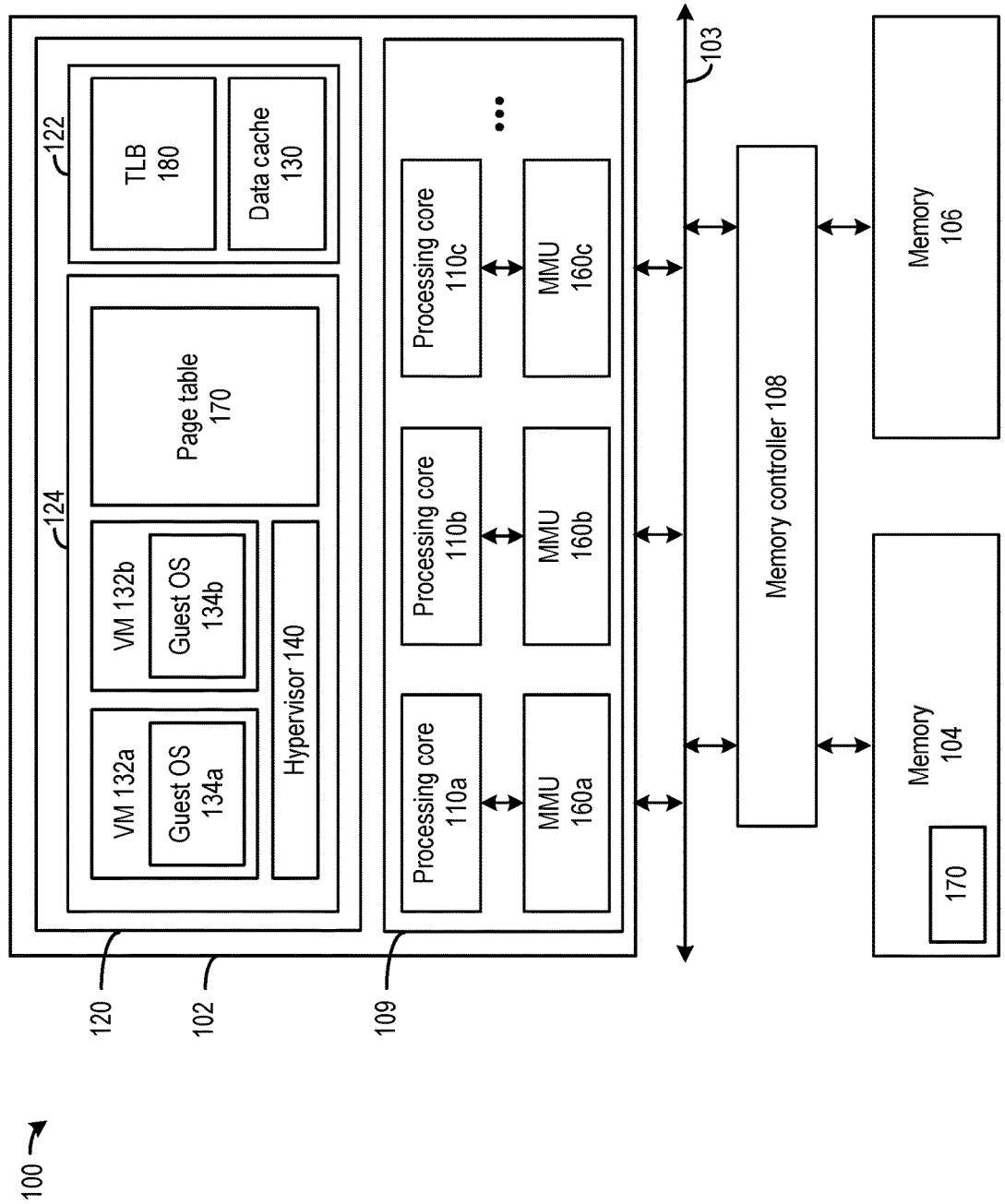
FIG. 1A, FIG. 1B, FIG. 1C, and FIG. 1D illustrate an example of a computing system in which data migration can be performed.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiments being described.

In a computing system, a data migration process between different memory devices can be performed for various reasons. For example, if certain data in a faster memory is not frequently used, it may be desirable to migrate the data from the faster memory to another slower memory, to make space in the faster memory for other more frequently used data and/or for other applications. As another example, a memory device can sustain a number of access operations before the failure due to the wearing effect of the access operations on the memory device. If certain data stored in the memory device is frequently accessed, the data can be migrated to another memory device after being accessed a certain number of times, to balance the number of access operations among the two memory devices, or to move the data from a memory device that may fail soon. As yet another example, the migration of data can be part of a virtual machine migration operation to move the virtual machine from a first host to a second host, to support a change in workload, for server maintenance, to address a faulty server, for disaster recovery, etc. The data can be migrated from a first memory address accessible to the first host to a second memory address accessible to the second host. In all these examples, a data migration process can be performed between memory devices of the same type or between different types of memory devices.

A data migration process in a computing system typically involves a number of operations. First, a computing system typically includes an address translation scheme to translate a software accessible address (hereinafter, "software address") to a physical address in the memory device. The software address is an address on which a software application operates. The software application may include, for example, a software application operating in a virtual machine, a guest operating system, etc. In some examples, the software address may include, for example, virtual addresses of virtual memory pages. In some examples, the mapping of the virtual addresses and the physical addresses can be done indirectly via intermediate addresses which can be the aforementioned software addresses. For example, in a multi-tenant computing system, a guest virtual machine may have a mapping between virtual addresses and intermediate physical addresses (IPA) or guest physical addresses (GPA) accessible to the operating system of the guest virtual machine, and a mapping between the intermediate/guest addresses and the physical addresses. In such a case, the address translation scheme can translate a software address including an intermediate/guest address to an actual physical address.

The computing system typically includes a hierarchy of memories to store address translation data that map virtual addresses and/or intermediate/guest addresses to the physical addresses. The hierarchy of memories may include a memory page table which stores, in each entry, a mapping between a virtual address of a virtual memory page to a physical address, as well as a translation lookaside buffer (TLB) that caches the most recently-used mappings. As part of the data migration process, to allow a software application to continue to access the data using the same virtual address after the data is migrated from a first physical address to a second physical address, the memory page table needs to be updated to map that virtual address to the second physical address. The TLB also needs to be flushed to ensure that the old mapping between that virtual address and the first physical address is removed and will never be used by the software application again.

In addition, there are memory access operations in the data migration process. First, data needs to be read from the first physical address and written to the second physical address to perform the data migration. Moreover, if the software application is allowed to modify the data at the first physical address while the data migration is underway, a potential data synchronization problem may arise in which the data migrated is not the most up-to-date data. In such a case, the migration of the data may need to be repeated to ensure that the most up-to-date data is migrated, which leads to additional memory access operations. The number of memory access operations will be further increased for a bulk data migration process, which includes migration of data for thousands, if not millions, of virtual memory pages.

Currently, data migration can be performed by a central processing unit (CPU) of the computing system, which can execute software instructions to perform the aforementioned operations involved in the data migration process. However, the operations involved may pose significant burden to the CPU and use up cycle time and computation resources that are needed for other more time-sensitive computing tasks. Specifically, each memory access operation typically takes a relatively long duration to complete. Using the CPU to perform memory access operations would take away computation resources and cycle times of the CPU that would otherwise be available for execution of other more time-sensitive software applications, especially when the CPU needs to repeat some of the memory access operations to ensure the most up-to-date data is migrated, and to update the page tables, as described above. Moreover, an interrupt, such as an inter-processor interrupt (IPI) in a multiprocessor system, can be sent to the CPU to perform the TLB flush for its own TLB, or to notify the CPU of the flushing of the TLB. The handling of the interrupt by the CPU can also take away computation resources and cycle times of the CPU that would otherwise be available for execution of other more time-sensitive software applications. Given that the data migration process is typically not time-sensitive, using the CPU to perform data migration at the expense of other more time-sensitive application wastes the precious computing power of the CPU.

Embodiments of the disclosed technologies provide an integrated circuit configured as a hardware memory migration agent for the CPU. In some examples, the integrated circuit can be in the same chip package or as part of the same system-on-chip (SoC) as the CPU. In some examples, the integrated circuit can be in a different chip from the CPU and can communicate with the CPU via an interconnect. The integrated circuit can be an application-specific integrated circuit (ASIC), a field programmable gate array (FPGA), a microcontroller capable of executing software instructions, etc.

The hardware memory migration agent includes a request parser, a copy operation manager, a page table manager, a TLB manager, and a controller, each of which can be hardware circuits and/or software instructions executable on a microcontroller of the hardware memory migration agent. The request parser can receive, from the CPU, a request to perform a data migration process for a piece of data stored at a software address and extract parameters of the data migration process from the request. The software address can include a virtual address of a virtual memory page, an intermediate/guest address, etc. The copy operation manager can perform memory access operations based on the parameters of the request to migrate the data. The memory access operations include reading the data from a source physical address in a first memory and writing the data to a destination physical address in a second memory. The page table manager can update the mapping between the software address and the source physical address in a page table so that the software address is mapped to the destination physical address, to reflect the migration of the data to the second memory, whereas the TLB manager can indicate to the CPU to flush the TLB after the page table is updated. The controller can coordinate the operations of the request parser, the copy operation manager, the page table manager, and the TLB manager.

Specifically, the data migration process may include one or more page migration processes, each conto migrate data stored in a virtual memory page from a first memory to a second memory. The request may include parameters for a page migration process, or multiple page migration processes. The parameters may include, for example, a memory page table entry (or a reference to the entry) of a mapping between the software address and a source physical address (in the first memory), a destination physical address (in the second memory) to receive the data, and a size of the data. The controller can then control the request parser to extract, from the request, the mapping information, the destination physical address, and the size of the data as parameters, and provide the parameters to the copy operation manager.

The controller can then control the copy operation manager to perform the memory access operations based on the parameters from the request parser. Specifically, the copy operation manager can obtain the source physical address from the mapping information, as well as the size information. The copy operation manager can provide the source physical address and the size information to a memory controller to perform one or more read operations at the first memory to obtain the data. The copy operation manager can also provide the destination physical address and the size information to the memory controller (or to a different memory controller) to perform one or more write operations at the second memory to store the data, as part of a page migration process.

After the memory access operations for the page migration process complete, the controller can control the page table manager and the TLB manager to update the memory hierarchy that stores the address translation data. Specifically, the memory hierarchy includes the first memory (or other memory) that stores a memory page table, as well as a translation lookaside buffer (TLB). The memory page table can store the memory table entry included in the request, whereas the TLB stores the most recently-used mappings between virtual addresses and physical addresses. The controller can control the page table manager to perform a memory write operation to update the mapping of the memory table entry, to map the virtual address of the virtual memory page to the second physical address. After the page table entry is updated, the controller can control the TLB manager to transmit a signal to the CPU to flush the TLB. The signal may include, for example, an invalidation command. The invalidation command can be broadcast (e.g., over an internal interconnect of the computing system) and can be detected (snooped) by a TLB controller. The TLB controller, upon detecting the invalidation command, can perform the flushing in parallel with the execution of the CPU. In some examples, the signal may also include an interrupt, such as an inter-processor interrupt (IPI), to indicate the flushing of the TLB to other CPUs and/or to request the other CPUs to flush their own TLBs. The controller can also broadcast a cache maintenance command on the interconnect, which can be detected/snooped by a data cache controller. The data cache controller, upon detecting the cache maintenance command, can then invalidate the cache line of a data cache that stores the migrated data. By invalidating the cache line, next time when the CPU needs to access the migrated data, the CPU will have to perform read and write operation to the data at the destination physical address and to fetch the data from the destination physical address to the data cache. Such arrangements can ensure that the data in the data cache is synchronized with the data stored in the destination physical address.

As described above, if a software application (being executed by the CPU) is allowed to modify the data while the data migration is underway, a potential data synchronization problem may arise in which the migrated data is not the most up-to-date data. The hardware memory migration agent may adopt various techniques to ensure that the migrated data is the most up-to-date. In one example, prior to the copy operation manager performing the memory read operation to read the data, the controller of the hardware memory migration agent can control the page table manager to set an indicator at a first value in the page table entry to prevent the CPU from accessing (or at least writing to) the software address. The indicator may include a valid flag which can be de-asserted by the page table manager to invalidate the page table entry, an accessed flag which can be de-asserted to indicate the page table entry has not been accessed, etc. The indicator may also include a dirty flag which can be asserted by the CPU if the CPU writes to the data associated with the software address. To prevent the CPU from accessing (or at least writing to) the software address, the controller can force the valid flag, the accessed flag, and/or the dirty flag in the de-asserted state and to not allow the CPU from asserting any of these flags. With such arrangements, the execution of the software application that attempts to cause the CPU to access the page table entry and/or to write to the software address can be suspended when the data migration process is underway. While such arrangements can ensure the migrated data is the most up-to-date, the execution of the software application is also suspended, which may be unacceptable if the execution of the software application is time-sensitive or even time-critical.

In another example, to reduce the disruption to the execution at the CPU, the controller of the hardware memory migration agent can control the page table manager to update the indicator (e.g., the dirty flag) to a default state, but without forcing the indicator to remain at that state. The hardware memory migration agent can then go ahead with the copying of the data while monitoring whether the indicator changes to a different state which indicates that the software address has received a write operation. Specifically, prior to the copy operation manager performing the memory read operation to read the data from the first physical address, the controller can control the page table manager to de-assert the dirty flag of the page table entry. After the copy operation manager writes the data to the second physical address, the page table manager can determine whether the dirty flag has been asserted. If the dirty flag has not been asserted, which indicates no new write operation is performed to the virtual address and the data migrated is the most up-to-date, the page table manager can update the page table entry as described above. On the other hand, if the dirty flag has been asserted, which indicates a new write operation is performed to the virtual address during the migration of the data, the controller can take various measures. For example, the controller can control the copy operation manager to repeat the memory read and write operations to migrate the data again after a time-out period, and then check the dirty flag again, until the dirty flag remains de-asserted after the write operation completes. As another example, the controller can also terminate the data migration process for that virtual address, as the CPU is likely to resubmit another request to perform the data migration process for that virtual address in the future.

In addition, typically a data migration process is not time-sensitive, and the hardware memory migration agent does not need to perform the data migration process immediately after receiving the request. Instead, the hardware memory migration agent can perform the data migration process asynchronously with the reception of the data migration requests. To support asynchronous processing of data migration requests, the hardware memory migration agent may include a request queue to store the data migration requests received from the CPU. The controller can obtain the requests from the queue based on the order by which the requests are stored in the queue, and provide the requests to the request parser. After the data migration process for a request has been completed (based on the updating of the page table entry and the flushing of the TLB), the request can be removed from the queue. The controller can implement various queue management policies to minimize the impact of the data migration processes to the CPU. For example, the controller can obtain a request from the queue and process the request when, for example, the memory devices involved in the migration are idle or are relatively lightly accessed, when the number of requests in the queue exceeds a threshold, etc.

With the disclosed techniques, the data migration process can be offloaded from the CPU to the hardware memory migration agent, which can preserve the precious computing resources and cycle times of the CPU for other more time-sensitive software applications, which can improve the utilization of the CPU. Moreover, the asynchronous and batch processing of the data migration requests from the CPU, as well as the batching of the TLB flushes, can also reduce disruptions to the CPU. All these can reduce the impact of the data migration processes on the performance of the computing system while fulfilling the purpose of the data migration process (e.g., to balance write operations among the memory devices, to move data that are accessed infrequently from a fast memory, to perform a live migration for a virtual machine, etc.).

FIG. 1A illustrates an example embodiment of a computing system 100 in which techniques of the present disclosure can be applied. Computing system 100 may include a host device 102, an interconnect 103, a first memory 104, a second memory 106, and a memory controller 108. Host device 102 is coupled with memory controller 108 via interconnect 103 and can access first memory 104 and second memory 106 via memory controller 108. Interconnect 103 may include various bus protocols such as, for example, Peripheral Component Interconnect (PCI) based protocols, Non-Volatile Memory Express (NVMe), Advanced Host Controller Interface (AHCI), Small Computer System Interface (SCSI), Serial Attached SCSI (SAS), Serial AT Attachment (SATA), Parallel ATA (PATA), Direct Memory Access (DMA), some other standard bus protocol, or a proprietary bus protocol. First memory 104 and second memory 106 can include volatile memories (e.g., DRAM, etc.), non-volatile memories (e.g., PRAM, MRAM, storage class memory (SCM), flash memory, hard disk, etc.), or a combination of both. In some examples, first memory 104 and second memory 106 may include different types of memory devices and/or operate at different speeds. In such a case, memory controller 108 may include two different memory controllers each to interface with, respectively, first memory 104 and second memory 106. In some examples, first memory 104 and second memory 106 can have the same type of memory devices and/or operate at the same speed, and can be accessed via a single memory controller 108.

In addition, host device 102 may include a host processor 109, which may include a multi-core processor system including multiple processor cores including, for example, processor core 110a, 110b, 110c, etc. Each processor core can execute software instructions. Host device 102 further includes a host memory 120, which can include a hierarchy of on-chip host memory 122 (e.g., SRAM) and off-chip host memory 124 (e.g., DRAM) to store the software instructions and the associated data for each processor core for execution and processing. Host device 102 can fetch the software instructions and data from, for example, one of first memory 104 or second memory via memory controller 108, and store the software instructions and data at off-chip host memory 124. Some of the data can then be fetched from off-chip host memory 124 and cached in on-chip host memory 122 in data cache 130. The data in data cache 130 can then be fetched from on-chip host memory 122 to the processor cores 110 to support the execution of the software instructions.

In some examples, computing system 100 may be part of a server system, which may be configured to provide multi-tenant compute services. For example, the system 100 may provide services such as cloud computing, cloud storage, analytics, web services, databases, applications, deployment services, etc. to different clients. Each client can operate, on host device 102, a virtual machine (VM), which can execute a guest operating system (OS) as well as various software applications. As to be described below, the guest OS can manage the access of the software applications executing in a virtual machine to first memory 104 and second memory 106. As shown in FIG. 1A, host memory 120 can store the software instructions of a plurality of VMs for a plurality of clients including, for example, VM 132a and 132b, as well as their guest OS 134a and 134b, which can be executed by the processor cores of host processor 109. In addition, in some examples, host device 102 may also operate a hypervisor 140 or a virtual machine manager (VMM) to emulate a single device as multiple virtual devices in a virtualized environment. The virtual machines 132a and 132b may be any suitable emulation of a computer system that may be managed by hypervisor 140. For example, hypervisor 140 may be configured to create, start, monitor, stop or delete the VMs executing on host processor 109. Hypervisor 140 may also manage the access of the VMs to various resources of computing system 100, including first memory 104 and second memory 106. In some examples, as to be described below, hypervisor 140 may also perform other operations related to the resources of computing system 100, such as data migration, live migration of a virtual machine, etc.

As described above, a software application running on host processor 109 may access first memory 104 and/or second memory 106. An OS (e.g., a guest OS 134a) can provide the software application access to a virtual memory space which is mapped to physical addresses in first memory 104 and second memory 106. The software application can access the virtual memory space to perform various memory access operations to first memory 104 and second memory 106.

Virtual memory is a memory management technique that can be used for various reasons, including freeing user applications from having to manage a shared memory space, improving security and memory protection due to memory isolation, extending physical memory beyond the main memory, providing a contiguous address space visible by a software application, etc. The operating system of a computing system manages virtual address spaces, whereas the mapping between the virtual addresses and the physical addresses can be managed by the operating system, hypervisor 140, etc.

Figure 1B:
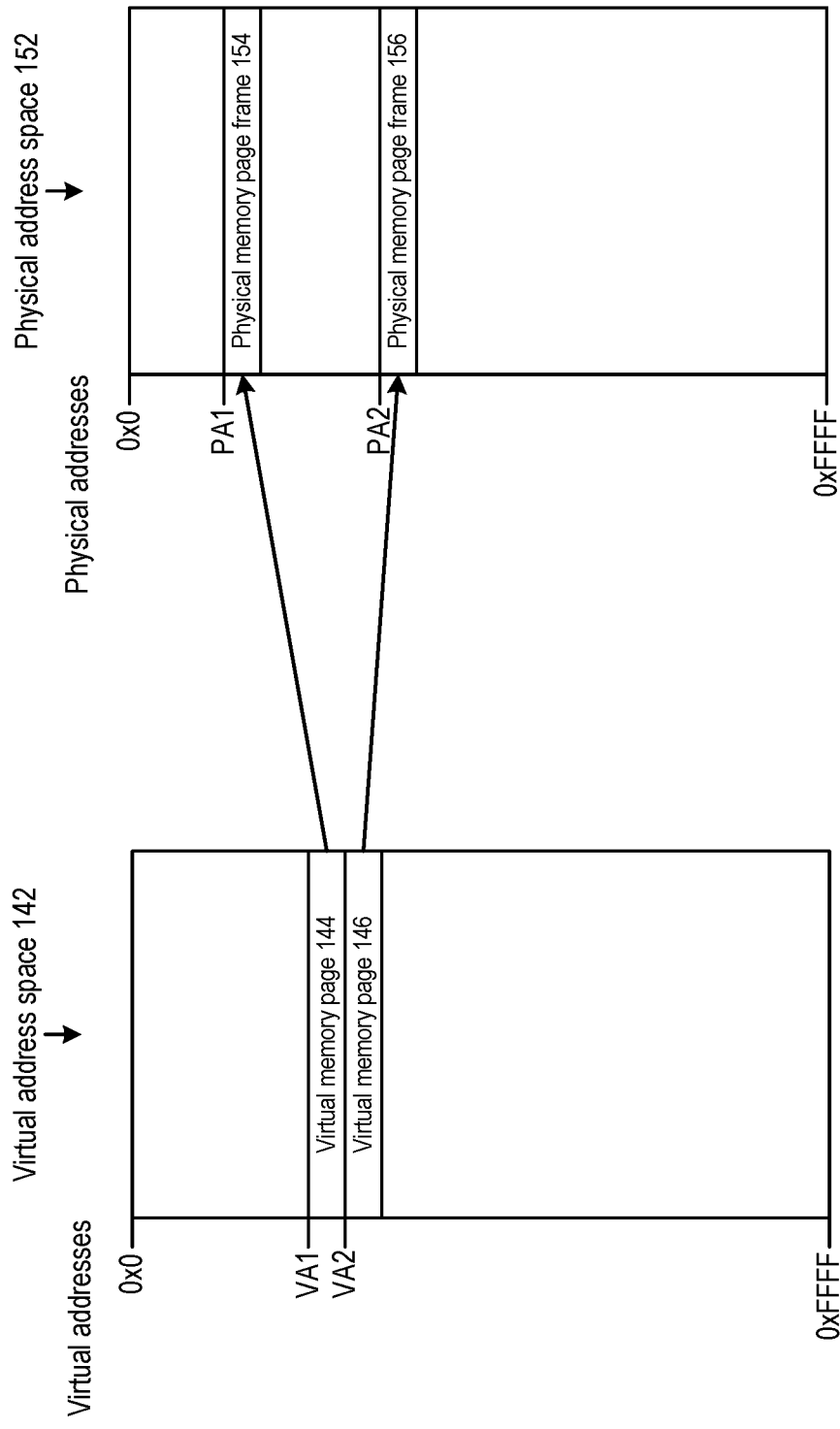

FIG. 1B illustrates an example of mapping between virtual memory and physical memory. As shown in FIG. 1B, a contiguous virtual address space 142 which spans between address 0x0 and 0xFFFF can be provided to a software application, to a virtual machine, etc. Virtual address space 142 includes a plurality of virtual memory pages, such as virtual memory page 144, 146, etc. Each virtual memory page can include a fixed-length contiguous block of virtual address space 142 and can correspond to the smallest unit of the virtual address space managed by the operating system. In some examples, each virtual memory page can have a size of 4 kilobytes (kB). Each virtual memory page is associated with a virtual address (e.g., VA1, VA2, etc.) in virtual address space 142. At least some of the virtual memory pages can be mapped to blocks of the physical memory called page frame, and each page frame is associated with a physical address in physical address space 152. For example, virtual memory page 144 can be directly mapped (represented by a dotted-line arrow) to a physical memory page frame 154, whereas virtual memory page 146 is mapped (represented by a dotted-line arrow) to a physical memory page frame 156. Each physical memory page frame is associated with a physical address (e.g., PA1, PA2, etc.). Virtual memory pages that are contiguous (e.g., virtual memory pages 144 and 146) can be mapped to non-contiguous memory page frames of the memory. Moreover, different virtual memory spaces (of different virtual machines) can also be mapped to different sets of memory page frames of the memory. With such arrangements, a contiguous virtual address space can be provided to a software application which can facilitate the application's access to the physical memory.

In some examples, the mapping between the virtual addresses and the physical addresses can be indirect via an intermediate address space 162. The intermediate address space can be a set of physical addresses on the same memory as physical address 152, or on a different memory. The intermediate address can provide an extra layer of indirection to prevent direct access to physical address space 152. For example, in a multi-tenant environment, each guest machine can be provided access to an intermediate address space which acts as a guest address space. The intermediate address space can be on a different memory or at a different region of the memory as physical address space 152. Each guest virtual machine can have a different intermediate address to prevent a guest virtual machine from accessing other guest virtual machine's intermediate address space. In the example of FIG. 1B, as part of the indirection, virtual memory page 144 can be mapped (represented by a solid-line arrow) to an intermediate memory page 164 of intermediate address space 162, which is then mapped (represented by a solid-line arrow) to physical memory page frame 154. Moreover, virtual memory page 146 can be mapped (represented by a solid-line arrow) to an intermediate memory page 166 of intermediate address space 162, which is then mapped (represented by a solid-line arrow) to physical memory page frame 156. The mapping between virtual address space 142 and intermediate address space 162 is visible/accessible to a guest virtual machine, while the mapping between intermediate address space 162 and physical address space 152 is not visible/accessible to the guest virtual machine and is maintained by, for example, hypervisor 140. In all these examples, in the physical memory the allocation of the virtual memory space for the software applications and the virtual machines can be decoupled from the allocation of the physical memory space. For example, there is no need to allocate a large contiguous block of memory to the application. All these can improve the flexibility in the memory allocation operation and can improve the utilization of the physical memory.

As described above, the use of virtual memory, however, requires a translation between virtual addresses and physical addresses and/or a translation between intermediate addresses and actual physical addresses. For example, when host processor 109, while executing a software application, performs a memory access operation (e.g., read operation, write operation, etc.) to a virtual memory page, the physical address of the corresponding physical memory page frame is provided to memory controller 108 to perform the actual memory access operation. To support the memory access operation, host processor 109 (or computing system 100) needs to translate a software address, which can be a virtual address of the virtual memory page, an intermediate address, etc., to the physical address of the corresponding physical memory page frame. In some examples, the translation can be performed by a memory management unit (MMU) that is part of host processor 109. Referring to FIG. 1A, host processor 109 can include a plurality of MMUs 160, with each MMU configured to perform address translation for one or more of the processing cores 110. For example, MMU 160a can perform address translation for processing core 110a, MMU 160b can perform address translation for processing core 110b, whereas MMU 160c can perform address translation for processing core 110c. When a processing core (e.g., processing core 110a) executes an instruction to perform a memory access operation, the virtual address associated with the memory access operation can be forwarded to an associated MMU (e.g., MMU 160a), which can translate the virtual address to a physical address. The MMU can then forward parameters of the memory access operation and the physical address to memory controller 108 to perform the memory access operation.

The MMUs can refer to data of the mapping between the virtual addresses/intermediate addresses and the physical addresses to perform the translation. The mapping data can be organized in the form of a page table. A page table can store a set of the mapping between the virtual addresses of each virtual memory page provided to a user of a physical memory (e.g., a software application, a virtual machine, a processing core, etc.) and the physical addresses of each physical memory page frame allocated to that user. As shown in FIG. 1A, page table 170 can be stored in host memory 120 which can be accessed by MMUs 160a-160c to perform the address translation. Page table 170 (or other page tables) can also be first stored in a lower level memory, such as first memory 104, second memory 106, or a different memory, and can be retrieved by host processor 109 and stored in host memory 120 when host processor 109 needs to translate a physical address included in page table 170.

Figure 1C:

FIG. 1C illustrates an example of page table 170. As shown in FIG. 1C, page table 170 includes a plurality of page table entries (PTEs), including PTE 171. Each PTE includes a physical address field 172, and an optionally, a software address field 174. Each PTE maps a physical address of a physical memory page frame (stored in physical address field 172) to a software address. In some examples, the PTE itself can be stored at an address based on the software address (or an intermediate/guest address). In such a case, the PTE does not include software address field 174, and the mapping between the physical address and the software address can be implicit and based on the address of the PTE and the physical address field 172 of the PTE. The mapping can be created by, for example, a guest operating system (e.g., guest OA 134a) in a case where the guest operating system has access to the physical addresses, hypervisor 140 (which allocates the intermediate address space to a guest virtual machine and maps the intermediate address space to the physical address space), or both. For example, the guest operating system of a virtual machine can provide a list of virtual addresses of virtual address space 142 accessible to the virtual machine, whereas hypervisor 140 can manage the allocation of physical addresses in physical address space 152 to different virtual machines by mapping physical address space 152 to different intermediate address spaces 162, and assigning a different intermediate address space 162 to each guest virtual machine, which then maps the intermediate address space 162 to its own virtual address space 142. Hypervisor 140 can store the mapping information between the physical addresses and the intermediate addresses/virtual addresses in page table 170.

In addition, each PTE also includes a page dirty flag 176, a PTE valid flag 178, and in some examples, an accessed flag 179. Page dirty flag 176 can indicate whether the virtual memory page, referenced by the virtual address and the physical address stored in the PTE, has recently received a write operation since the last read operation. Host processor 109 can assert page dirty flag 176 of a PTE when performing a write operation to the virtual memory page referenced by the PTE, and can de-assert page dirty flag 176 of the PTE when executing an explicit clear instruction to clear the page dirty flag. PTE valid flag 178 can indicate whether the PTE includes a valid mapping of a physical address and a virtual address. If PTE valid flag 178 is asserted, the mapping of the PTE can be used by host processor 109 to perform the address translation. But if PTE valid flag 178 is de-asserted, the PTE is invalid, and host processor 109 can be trapped when attempting to access an invalid PTE. The trap can be handled with an exception to a different level or the same level.

In some examples, the trapping can cause host processor 109 to suspend execution of the software application that attempts to access the virtual address of the PTE, until PTE valid flag 178 of the PTE is asserted again. In addition, accessed flag 179 can indicate whether the PTE has been accessed (for a memory read operation, a memory write operation, etc.). Accessed flag 179 can be used to determine whether a PTE has not been used (since the last time the accessed flag was cleared) and hence can be replaced by other mappings of virtual addresses and physical addresses. Accessed flag 179 can be asserted by host processor 109 after accessing the PTE. In some examples, host processor 109 can also be trapped when attempting to assert accessed flag 179 after accessing the PTE, but accessed flag 179 stays de-asserted and a trap handler (e.g., of host processor 109) can determine how the trap is handled. As to be described below, at least one of PTE valid flag 178 or accessed flag 179 can be controlled to prevent host processor 109 from modifying a piece of data in first memory 104 when that data is being migrated to second memory 106.

To facilitate memory access by host processor 109, the PTEs of page table 170 can be stored in a hierarchy of memories including, for example, host memory 120 and first memory 104/second memory 106. For example, page table 170 can be initially stored in one of first memory 104 or second memory 106. If host processor 109 cannot find a page table in host memory 120 that stores the virtual address it needs to access, host processor 109 can fetch page table 170 from one of first memory 104 or second memory 106, and store page table 170 in off-chip host memory 124 of host memory 120. Moreover, to further speed up the memory access, host processor 109 can also extract the PTE that stores the virtual address from page table 170, and store the PTE in on-chip host memory 122 of host memory 120. As on-chip host memory 122 (e.g., SRAM) provides a much shorter access latency than off-chip host memory 124 (e.g., DRAM), storing the PTE at on-chip host memory 122 allows host processor 109 to obtain the address mapping information from the PTE and perform translation of the virtual address stored in that PTE more quickly, which can speed up memory access by host processor 109 especially when host processor 109 repeatedly accesses the same virtual address.

Referring back to FIG. 1A, the information of PTEs can be stored in a translation lookaside buffer (TLB) 180 in on-chip host memory 122 of host memory 120. In some examples, on-chip host memory 122 may store multiple instances of TLB 180, with each instance being used by a MMU of host processor 109. For example, TLB 180 may include a TLB 180a, a TLB 180b, a TLB 180c, etc. (not shown in FIG. 1A), where TLB 180a is used by MMU 160a to perform address translation, TLB 180b is to be used by MMU 160b, while TLB 180c is to be used by MMU 160c.

Figure 1D:
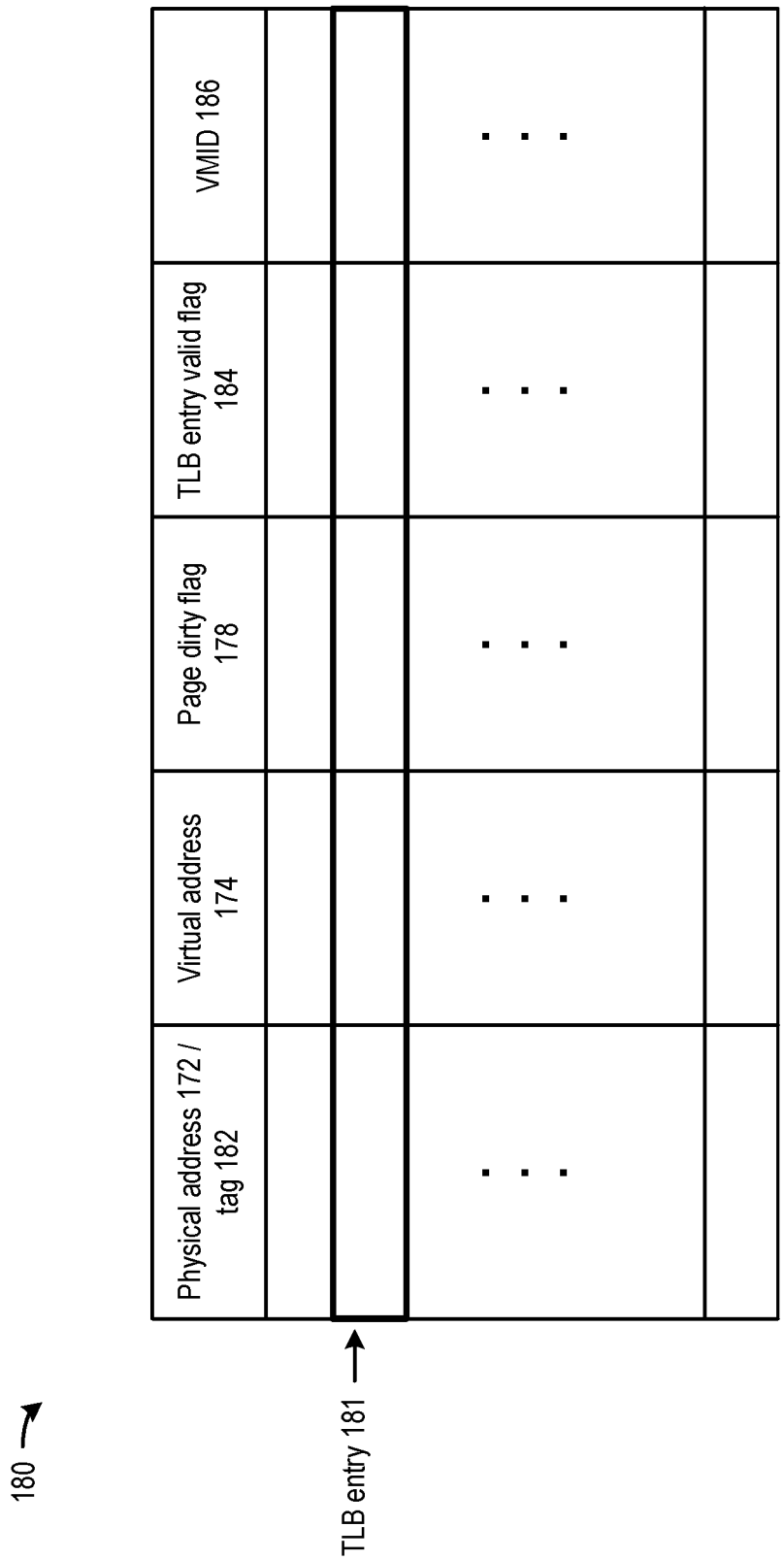

FIG. 1D illustrates an example of TLB 180. As shown in FIG. 1D, TLB may include a plurality of TLB entries, including TLB entry 181. Each TLB entry includes some of the information included in PTEs of page table 170, such as physical address field 172 and software address field 174 to store the mapping between a physical address and a virtual address. In some examples, instead of storing a full physical address, a tag 182 can be stored instead which includes a subset of bits (e.g., a number of most significant bits (MSBs)) of the physical address, in a case where TLB is implemented as a set-associative cache. Host processor 109 can search for a TLB entry based on an input virtual address, and obtain a physical address from the physical address field 172 of the TLB entry if the virtual address of virtual address field 174, or tag 182, matches the input virtual address. Each TLB entry also includes a page dirty flag 183 to indicate whether the page table entry storing the physical address 172 and software address 174 has been written since it was last cleared.

In addition, each TLB entry further includes a TLB entry valid flag 184 and a virtual machine identifier (VMID) field 186. TLB entry valid flag 184 may indicate whether the mapping between a virtual address and a physical address of the TLB entry is valid. The mapping may become invalid when, for example, that mapping in a PTE of page table 170 has been modified. In such a case, host processor 109 (or a TLB controller not shown in FIG. 1A) can invalidate the TLB entry by de-asserting the TLB entry valid flag. If the TLB entry is invalidated, the mapping between the virtual address and the physical address in that TLB entry will not be provided to host processor 109 even if the virtual address/tag of that TLB entry matches the input virtual address. Moreover, an invalid TLB entry can be selected, over other valid TLB entries, to be flushed (removed) to make room for another address mapping.

Furthermore, VMID field 186 can indicate an identifier of a virtual machine which has access to that TLB entry to perform address translation. Specifically, in some examples, hypervisor 140 may create different mappings between virtual addresses and physical addresses for different virtual machines to prevent each virtual machine from accessing other virtual machine's virtual address space (and the corresponding physical address space) to, for example, improve security. By specifying a VMID in a TLB entry, a virtual machine can be prevented from accessing the physical addresses allocated to other virtual machines. In some examples, a TLB may be implemented as a content-addressable memory (CAM), where the search key is the virtual page number and the search result is a physical page number. If the requested virtual page number is present in the TLB, a match may be found quickly and the retrieved physical page number can be used to access memory.

Referring back to FIG. 1A, computing system 100 can perform a data migration process between, for example, first memory 104 and second memory 106. The data migration process can be performed for various reasons. For example, first memory 104 can operate at a higher speed than second memory 106. VM 132a may have some data stored in first memory 104, but VM 132a does not access the data frequently. It may be desirable to migrate that data from first memory 104 to second memory 106, to make space in first memory 104 for other more frequently used data and/or for other applications, especially when first memory 104 is close to full capacity. As another example, a memory device can sustain a number of access operations before the failure due to the wearing of the access operations. In the example of FIG. 1A, first memory 104 may have received many more access operations than second memory 106. Certain data stored in first memory 104 that are accessed frequently can be migrated to second memory 106, such that those data can be accessed from second memory 106 moving forward, to balance the number of access operations among the two memory devices. As yet another example, the migration of data can be part of a virtual machine migration operation to move a virtual machine (e.g., VM 132a) from host processor 109 to a second host processor (not shown in FIG. 1A), to support change in workload, server maintenance, faulty server, disaster recovery, etc. The data can be migrated from first memory 104 accessible to host processor 109 to second memory 106 which is accessible to the second host processor. In all these examples, the data migration process can be transparent to the software application that uses the data. For example, while the physical address where the data is stored changes as a result of the data migration process, the software application can use the same virtual address to access the data.

In some examples, the data migration process can be performed by host processor 109 in executing, for example, hypervisor 140, a data migration software, etc. The data migration process typically involves a number of operations. First, as a result of the data being moved from a first physical address to a second physical address, the page table needs to be updated such that a virtual address of that data is mapped to the second physical address. To update the page table, host processor 109 can retrieve a PTE containing the virtual address from host memory 124, first memory 104, second memory 106, or other memories. Host processor 109 can also update physical address field 172 of the PTE to store the second physical address instead of the first physical address, and store the updated PTE back to the memory from which the PTE was retrieved. The identification of the first physical address from a PTE and the overwriting of the first physical address with the second physical address can be performed in an atomic compare and swap operation, which can be completed in a single step relative to other threads. The atomic operation is typically performed to avoid a racing condition where, for example, multiple processors are attempting to modify the same PTE, and to synchronize the modification of the PTE (or the page table) by multiple host processors and/or multiple processing cores 110 of host processor 109. Moreover, host processor 109 can also flush the TLB entry that includes the mapping between the virtual address and the first physical address by, for example, invalidating the TLB entry based on de-asserting the TLB entry valid flag 184 of the TLB entry, to ensure that the old mapping is removed and will never be used again. Furthermore, host processor 109 can also control memory controller 108 to perform a read operation at first memory 104 to read the data, and to perform a write operation at second memory 106 to write the data. In some examples, the data migration process may include multiple page migration processes each involving the migration of data from one memory page frame in first memory 104 to another memory page frame in second memory 106. Host processor 109 can repeat the aforementioned page table updating operation, TLB flush, and memory access operations for each page of the migration process.

Although host processor 109 can perform the data migration process, the operations involved may pose significant burden to host processor 109 and use up cycle time and computation resources that are needed for other more time-sensitive computing tasks. Specifically, each memory access operation (for updating page table, moving the data between memories, etc.) typically takes a relatively long duration to complete. Using host processor 109 to perform memory access operations would take away computation resources and cycle times of processing cores 110 that would otherwise be available for execution of other more time-sensitive software applications, especially when host processor 109 needs to perform a large number of memory access operations to migrate data for multiple virtual memory pages. Moreover, an interrupt, such as an inter-processor interrupt (IPI) in a multiprocessor system, can be sent to other processors to perform the TLB flush, or to notify the processors (including host processor 109) of the flushing of the TLB. The handling of the interrupt by host processor 109 can also take away computation resources and cycle times of processing cores 110 that would otherwise be available for execution of other more time-sensitive software applications. Given that the data migration process is typically not time-sensitive, using host processor 109 to perform data migration at the expense of other more time-sensitive application wastes the precious computing power of host processor 109.

Figure 2:
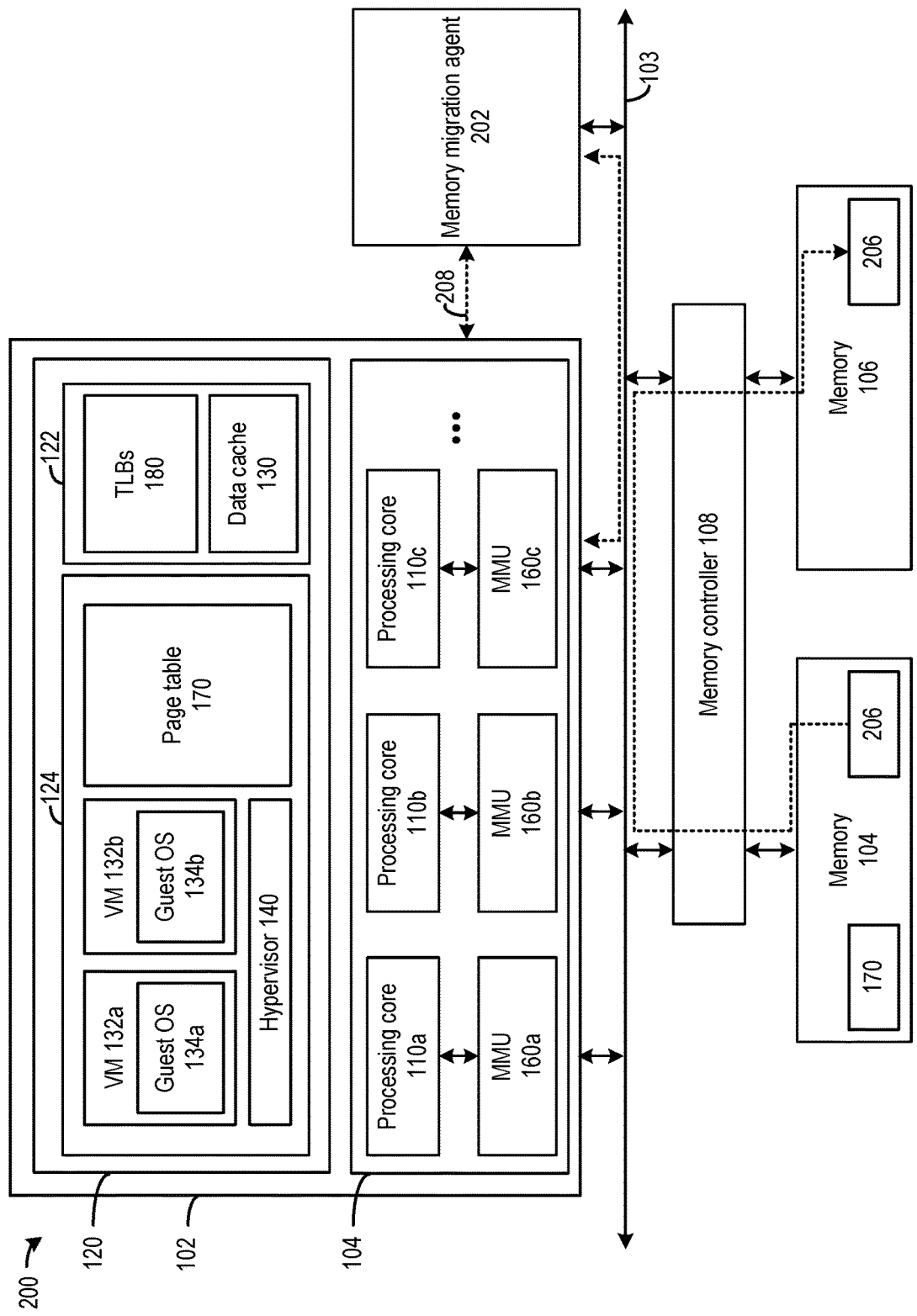
FIG. 2 illustrates an example hardware component of a computing system to perform data migration.

FIG. 2 illustrates an example computing system 200 that can perform data migration with reduced involvement from host processor 109. As shown in FIG. 2, computing system 200 includes host processor 104, host memory 120, memory controller 108, first memory 104, and second memory 106 of FIG. 1A. Computing system 200 further includes memory migration agent 202. Memory migration agent 202 can be an integrated circuit configured to perform the operations involved in a data migration process for host processor 104. In some examples, the integrated circuit can be in the same chip package or as part of the same system-on-chip (SoC) as the CPU. In some examples, the integrated circuit can be in a different chip from the CPU and can communicate with the CPU via an interconnect. The integrated circuit can be an application-specific integrated circuit (ASIC), a field programmable gate arrays (FPGA), a microcontroller capable of executing software instructions, etc.

Specifically, memory migration agent 202 can control memory controller 108 to perform read and write operations to first memory 104 and second memory 106, to migrate data 206 from first memory 104 to second memory 106. Moreover, memory migration agent 202 can update a PTE of page table 170 stored in first memory 104 (or other memory) to update the mapping between the virtual address and the physical address of data 204. Further, memory migration agent 202 can also communicate with host processor 109 (e.g., via interconnect 103, or via a direct communication channel 208) to obtain the information of the data migration (e.g., the PTE of data 206, the destination physical address to migrate data 206 to, the size of data 206, etc.) and to provide an indication of the updating of the PTE. The indication can be in the form of an interrupt, a message, etc. Based on receiving the indication, host processor 104 can perform other operations to complete the data migration process, such as flushing/invalidating entries of TLB 180 that store the mappings between virtual and physical addresses updated by memory migration agent 202.

Figure 3A:
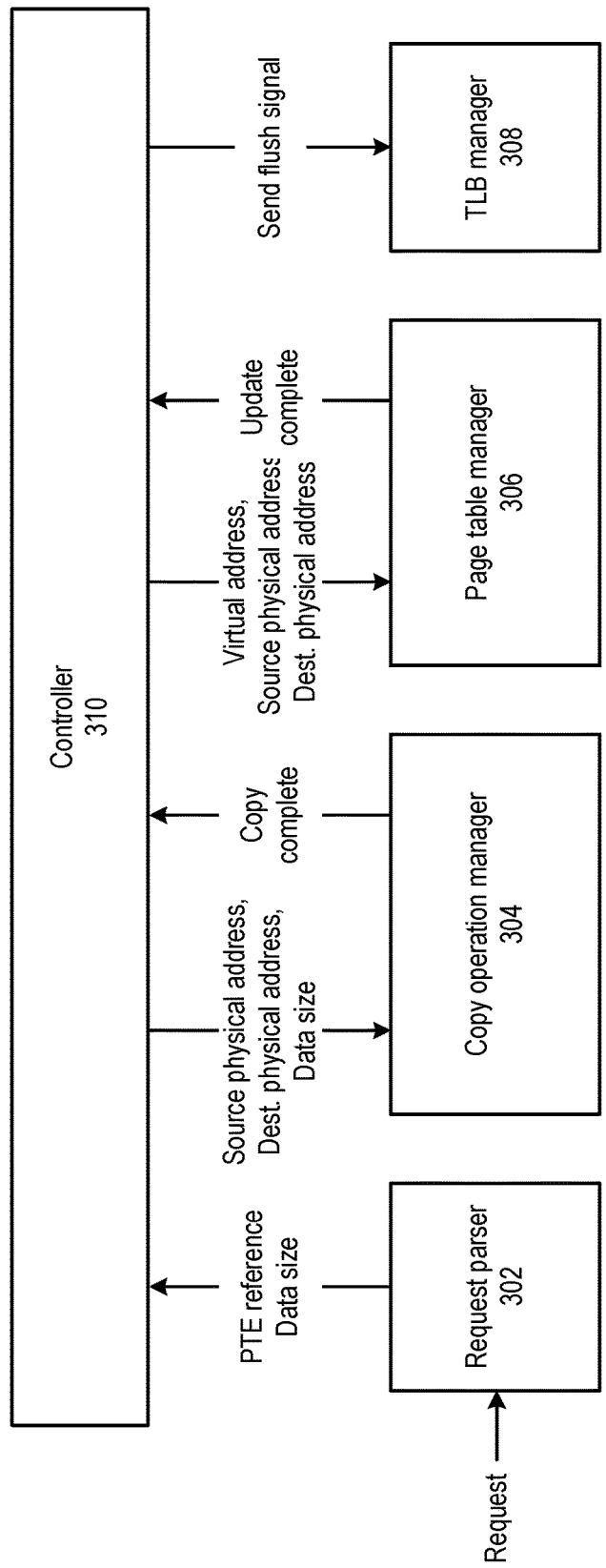

FIG. 3A illustrates an example of internal components of memory migration agent 202. As shown in FIG. 3A, memory migration agent 202 includes a request parser 302, a copy operation manager 304, a page table manager 306, a TLB manager 308, and a controller 310, each of which can be hardware circuits and/or software instructions executable on a microcontroller of memory migration agent 202. Request parser 302 can receive, from host processor 102, a request to perform a data migration process. Request parser 302 can extract parameters of the data migration process from the request. Copy operation manager 304 can perform memory access operations based on the parameters of the request to migrate a piece of data, such as data 206 in FIG. 2. The memory access operations include reading data 206 from a first memory (e.g., first memory 104) and writing data 206 to a second memory (e.g., second memory 106). The memory access operations can be direct memory access (DMA) operations. Page table manager 306 can update the mapping between virtual addresses and physical addresses in a page table (e.g., page table 170) in a lower level memory (e.g., first memory 104, or other memories) to reflect the migration of the data to the second memory. TLB manager 308 can transmit an indication, such as an interrupt, to host processor 104 to flush TLB 180 after page table 170 is updated. Controller 310 can coordinate the operations of various components of memory migration agent 202 including request parser 302, copy operation manager 304, page table manager 306, and TLB manager 308 to perform the data migration process.

Specifically, the data migration process may include a page migration process of migrating data stored in a virtual memory page from a first memory to a second memory. The request may include parameters for a page migration process to migrate data from one physical memory page frame to another physical memory page frame, or multiple page migration processes to migrate data from one set of physical memory page frames to another set of physical memory page frames. FIG. 3B illustrates an example format of a request 320 that can be received by request parser 302. As shown in FIG. 3B, request 320 may include the parameters for a page migration process which includes a reference 322 to a PTE to be updated for the data migration process, a destination physical address 324 of the destination physical memory page frame, and a data size 326 of a size of the data to be migrated. Reference 322 may include, for example, an address of the PTE in the memory (e.g., first memory 104), a pairing of a physical address and a software address from, respectively, physical address field 172 and virtual address field 174 of the PTE. In a case where request 320 includes the parameters for multiple page migration processes, request 320 may include multiple PTE references 322, multiple destination physical addresses 324, and multiple data sizes 326. Request parser 302 may receive request 320 via interconnect 103, direct communication channel 208, etc., extract the PTE reference, destination physical address, and data size based on a format of the request as shown in FIG. 3B, and provide the extracted page migration parameters to controller 310.

As described above, computing system 200 can perform a data migration process between, for example, first memory 104 and second memory 106. The data migration process can be performed in various scenarios, which can determine when request 320 is generated by host processor 109. For example, in a case where data is migrated from first memory 104 to second memory 106 because the data is accessed frequently enough, request 320 can be generated when, for example, a pre-determined duration has elapsed since the last time the data was accessed. As another example, in a case where data is migrated from first memory 104 to second memory 106 to balance the number of access operations between the memories, request 320 can be generated when a number of access operations at first memory 104 exceeds a threshold. In some examples, request 320 can also be generated based on host processor 109 receiving an external command to, for example, start a live migration of a virtual machine.

Referring back to FIG. 3A, controller 310 can provide the page migration parameters extracted by request parser 302 to copy operation manager 304, page table manager 306, and TLB manager 308, and coordinate their operations for a page migration operation. Specifically, controller 310 can obtain the source physical address of the data to be migrated from PTE reference 322 (e.g., by retrieving the PTE from the memory, or from the pairing of physical address and virtual address included in the request), and provide the source physical address to copy operation manager 304. Controller can also provide destination physical address 324, as well as data size 326, to copy operation manager 304. Copy operation manager 304 can provide the source physical address and the size information to memory controller 108 to perform one or more read operations at first memory 104, to read the data (e.g., data 206) from a first physical memory page frame associated with the source physical address. Copy operation manager 304 can also provide the destination physical address and the data size information to memory controller 108 to perform one or more write operations at second memory 106, to store the data at a second physical memory page frame associated with the destination physical address. By performing the read and write operations, data 206 can be moved from first memory 104 to second memory 106.

After the memory access operations are complete, copy operation manager 304 can transmit an indication to controller 310 that the copy operation is complete. Based on the indication, copy operation manager 304 can control page table manager 306 to update the PTE referenced by PTE reference 322. Page table manager 306 can either use the address of PTE, or the virtual address and/or the source physical address of the pairing included in PTE reference 322, to locate the PTE in first memory 104. The source physical address included in the PTE can then be updated with the destination physical address, so that the virtual address in the PTE is now mapped to the destination physical address. The searching and updating of the PTE in first memory 104 can be based on performing read and write operations via memory controller 108.

After the updating of the PTE completes, page table manager 306 can transmit an indication to controller 310 that the updating is complete. Based on the indication that the updating of the PTE is complete, controller 310 can transmit a flush signal to TLB manager 308, which causes TLB manager 308 to transmit a signal to host processor 109 to flush TLB 180. The signal may include, for example, an invalidation command. The invalidation command can be broadcast over interconnect 103 and can be detected (snooped) by a TLB controller (not shown in the figures). The TLB controller can perform the flushing in parallel with the execution of host processor 109 after detecting the invalidation command. In some examples, the signal may also include an interrupt, such as an inter-processor interrupt (IPI), to indicate the flushing of the TLB to other host processors and/or processing cores 110.

In addition, controller 310 can also broadcast, on interconnect 103, a cache maintenance command which can be detected/snooped by a data cache controller (not shown in the figures), which can then invalidate the cache line of data cache 130 that stores the migrated data. By invalidating the cache line, next time when the host processor 109 needs to access the migrated data, host processor 109 will have to perform read and write operation to the data at the destination physical address and to fetch the data from the destination physical address to the data cache. Such arrangements can ensure that the data in the data cache is synchronized with the data stored in the destination physical address.

As described above, if host processor 109 is allowed to modify the data while the data migration is underway, a potential data synchronization problem may arise in which the data migrated is not the most up-to-date data. For example, if host processor 109 modifies the data stored at the source physical address when or shortly after copy operation manager 304 copies the data to the destination physical address, the data stored at the destination physical address is not the most up-do-date.

Figure 4A:
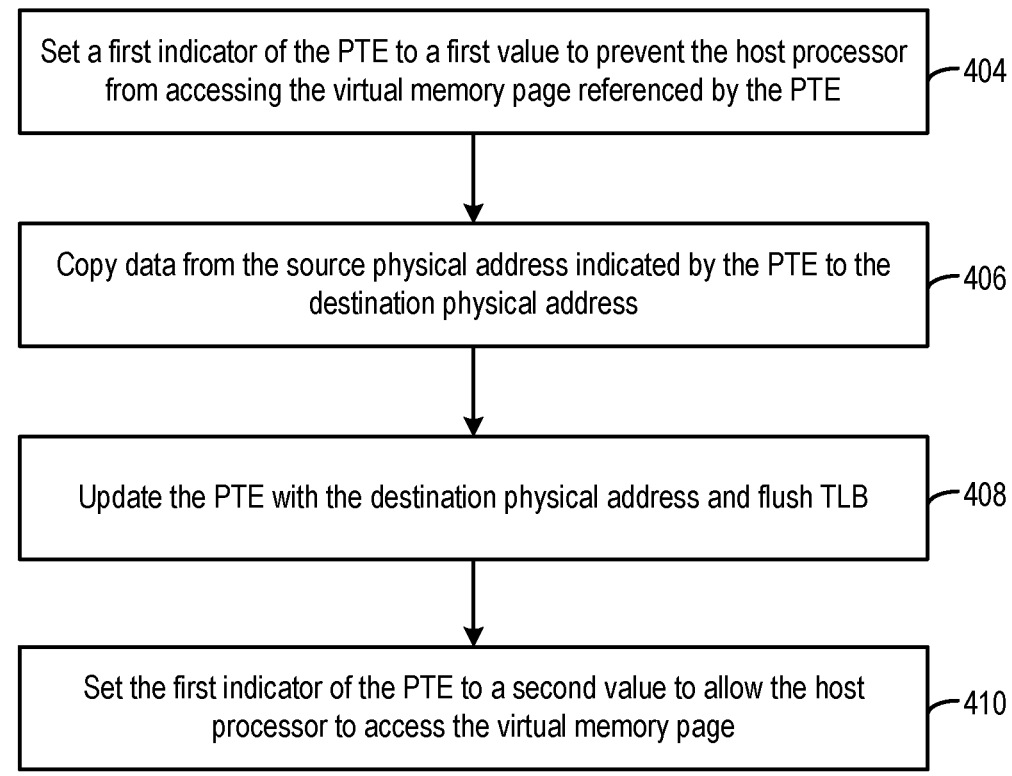
FIG. 4A and FIG. 4B illustrate example operations of the hardware component of FIG. 2.
Figure 4B:
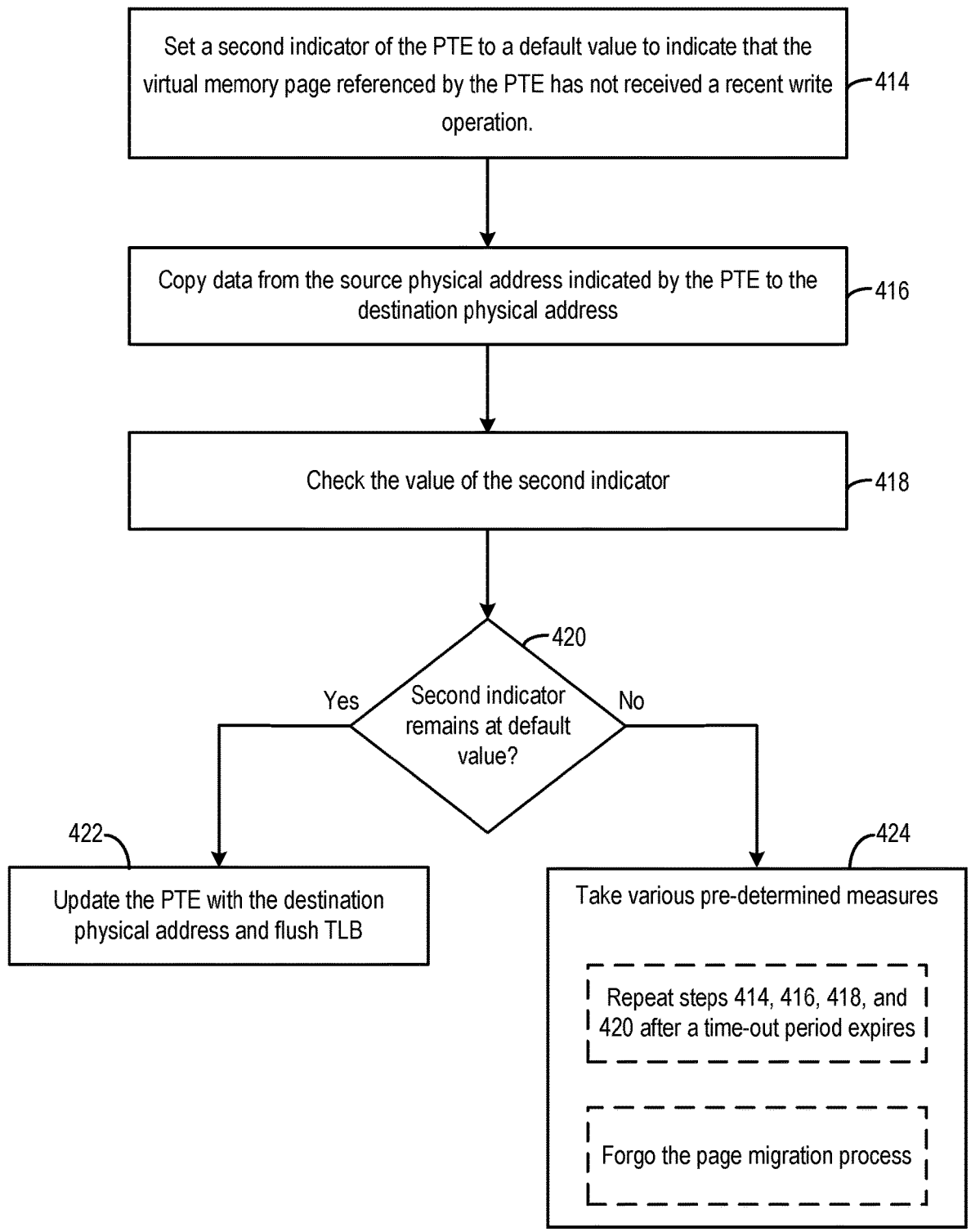

Memory migration agent 202 can adopt various techniques to ensure that the migrated data is the most up-to-date. FIG. 4A and FIG. 4B illustrate example operations performed by memory migration agent 202 to ensure that the migrated data is the most up-to-date. FIG. 4A illustrates an example operation 402. Referring to FIG. 4A, in step 404, controller 310 can control page table manager 306 to set an indicator of the PTE at a first value to prevent the CPU from accessing (or at least writing to) the virtual memory page referenced by the PTE. Step 404 can be performed prior to copy operation manager 304 performing the memory read operation to read the data.

In some examples, the indicator may include PTE valid flag 178, which can be de-asserted by page table manager 306 to invalidate the PTE. As described above, if PTE valid flag 178 is de-asserted, the PTE is invalid, and host processor 109 can be trapped when attempting to access an invalid PTE. In some examples, the trapping can cause host processor 109 to suspend execution of the software application that attempts to access the virtual address of the PTE, until PTE valid flag 178 of the PTE is asserted again. Therefore, by invalidating the PTE, host processor 109 can be trapped and prevented from updating the data at the source physical address during or after the migration of the data. As another example, the indicator may include accessed flag 179. As described above, accessed flag 179 can indicate whether the PTE has been accessed (for a memory read operation, a memory write operation, etc.) and can be asserted by host processor 109 after accessing the PTE. In some examples, host processor 109 can also be trapped when attempting to assert accessed flag 179 after accessing the PTE but accessed flag 179 stays de-asserted. Controller 310 can control page table manager 306 to force accessed flag 179 to stay de-asserted, to trap host processor 109 and to prevent it from updating the data at the source physical address during or after the migration of the data. As yet another example, page dirty flag 176 of a PTE can also be kept at a de-asserted state such that host processor 109 cannot assert page dirty flag 176 after writing to the software address stored in the PTE, to trap host processor 109.

In step 406, after setting the indicator of the PTE to the first value (e.g., PTE valid flag 178 and/or page dirty flag 176 being de-asserted), controller 310 can control TLB manager 308 to transmit a signal to host processor 109 to flush TLB 180, in step 406. The flushing of TLB 180 can ensure that TLB 180 does not store the original mapping between the virtual address and the source physical address. The signal may include, for example, an invalidation command broadcast on interconnect 103, an interrupt (e.g., IPI), etc.

In step 408, controller 310 can control copy operation manager 304 to copy data from the source physical address indicated by the PTE to the destination physical address from the request, in step 406. As described above, copy operation manager 304 can provide the source physical address and the size information to memory controller 108 to perform one or more read operations at first memory 104 to read the data. Copy operation manager 304 can also provide the destination physical address and the data size information to memory controller 108 to perform one or more write operations at second memory 106 to store the data. During step 406, host processor 109 is prevented from accessing (or at least writing to) the source physical address based on the indicator of the PTE (e.g., valid flag, accessed flag, dirty flag, etc.) being forced in the de-asserted state.

In step 410, controller 310 can control page table manager 306 to update the PTE. The updating includes setting the indicator to a second value (e.g., asserting PTE valid flag 178, asserting PTE accessed flag 179, etc.) and swapping the source physical address of the PTE with the destination physical address. Each of the setting of the indicator and the swapping of the physical addresses in the PTE can be performed as atomic operations. The setting of the indictor to the second value can stop the trapping of host processor 109. With the trapping removed, host processor 109 can then access the PTE to perform address translation and to access the destination physical address. As host processor 109 cannot write to the source physical address before or during the copying of the data from the first physical address to the second physical address, it can be ensured that the migrated data is the most up-to-date.

The arrangements of FIG. 4A can ensure the migrated data is the most up-to-date, since the execution of the software application is suspended. As a result, the execution of the software application at the CPU is interrupted, which may be unacceptable if the execution of the software application is time-sensitive or even time-critical. FIG. 4B illustrates another example operation 412 that can reduce interruption to the execution of software applications in host processor 109. Referring to FIG. 4B, in step 414, controller 310 can control page table manager 306 to de-assert page dirty flag 176. Step 414 can be performed prior to copy operation manager 304 performing the memory read operation to read the data. The de-assertion of dirty flag 176, which includes a compare operation (to determine the state of dirty flag 176) and a swap operation (to change the state of dirty flag 176), can be performed as an atomic operation. After page dirty flag 176 is de-asserted, controller 310 can also control TLB manager 308 to transmit a signal to host processor 109 to flush TLB 180, to ensure that TLB 180 does not store the original mapping between the virtual address and the source physical address.

After de-asserting page dirty flag 176, controller 310 can control copy operation manager 304 to copy data from the source physical address indicated by the PTE to the destination physical address from the request, in step 416, which is identical to step 406 of FIG. 4A.

In step 418, controller 310 can control page table manager 306 to check the state of the page dirty flag. For example, control page table manager 306 can perform a read operation to the memory that stores the page table, to determine whether page dirty flag 178 is asserted again. The assertion of page dirty flag 178 can indicate that the software address stored in the PTE has received a write operation when the data is being copied in step 416, and it is likely that the data migrated to the destination physical address in step 416 is not the most up-to-date. On the other hand, if page dirty flag 178 remains de-asserted, it can indicate that the virtual address has not received a write operation, and the data migrated to the destination physical address in step 416 is likely the most up-to-date.

If page dirty flag 178 remains de-asserted, in step 420, controller 310 can control page table manager 306 to update the PTE with the destination physical address, in step 422. On the other hand, if page dirty flag 178 has been asserted in step 420, which indicates a new write operation is performed to the virtual address during step 416, controller 310 can take various pre-determined measures, in step 424. For example, controller 310 can control copy operation manager 304 to repeat steps 414, 416, 418, and 420 after a time-out period expires. Specifically, controller 310 can control copy operation manager 304 to set the indicator (e.g., the page dirty flag) to the default value in step 414, repeat the memory read and write operations of step 416 to migrate the data again, check the indicator again in step 418, and determine whether the indicator remains at the default value after the write operation completes. The time-out period can be provided in case there are additional write operations to the virtual address, so that it is more likely that all the write operations complete before steps 414-420 are repeated and that the indicator will remain at the default value. As another example, the controller can also terminate the page migration process for that virtual address, if host processor 109 can resubmit another request to perform the page migration process for that virtual address in the future.

Figure 5:
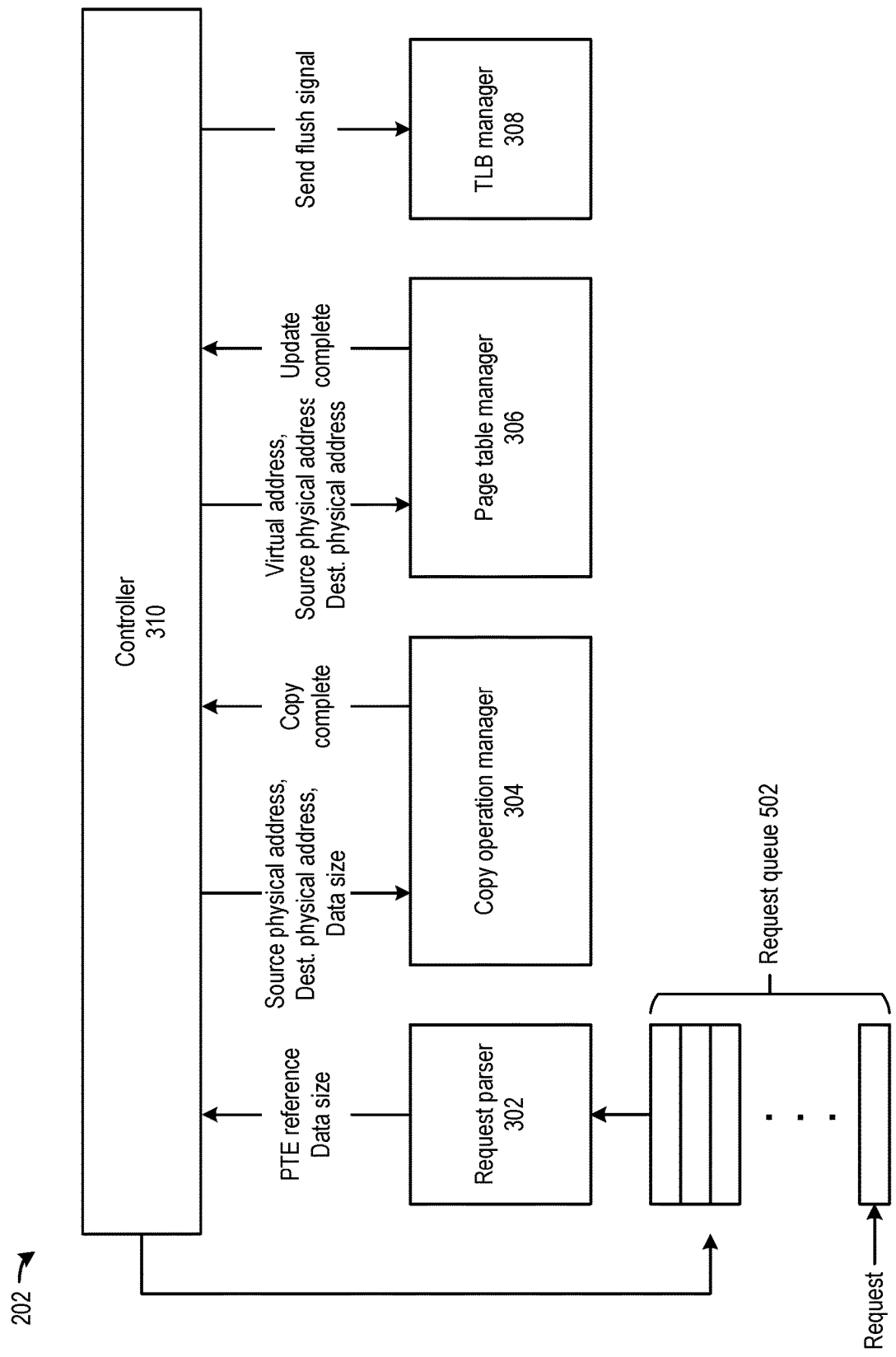
FIG. 5 illustrates another example hardware component of a computing system to perform data migration.

In addition, typically data migration process is not time-sensitive, and memory migration agent 202 need not perform the data migration process immediately after receiving the request. Instead, memory migration agent 202 can perform the data migration process asynchronously with the reception of the data migration requests. FIG. 5 illustrates additional components of memory migration agent 202 to support asynchronous processing of data migration requests. As shown in FIG. 5, memory migration agent 202 may include a request queue 502 to store the data migration requests received from host processor 109. In some examples, request queue 502 can be configured as a first-in-first-out (FIFO) buffer, where controller 310 can retrieve the requests from request queue 502 based on the order by which the requests are stored in the queue, and provide the requests to request parser 302. After the data migration process for a request has been completed (e.g., based on the updating of the page table entry by page table manager 306, etc.), the request can be removed from request queue 502.

As part of the asynchronous processing of data migration requests, controller 310 can implement various queue management policies to reduce the impact of the data migration processes to host processor 109. For example, controller 310 can obtain a request from request queue 502 and process the request when, for example, the memory devices involved in the migration are idle or are relatively lightly accessed by host processor 109, to avoid performing the data migration process when host processor 109 actively accesses the memory devices. As another example, controller 310 can process the requests and perform the associated data migration processes when the number of requests in request queue 502 exceeds a threshold. Controller 310 can also process the number of requests from request queue 502 in a batch. Such arrangements can be advantageous for a number of reasons. First, by processing the requests in a batch within a time period instead of at different time periods, there is less likelihood of the data migration processes interfering with the operations of host processor 109. All these can reduce the number of interrupts and the resulting disruptions to host processor 109.

Figure 6:
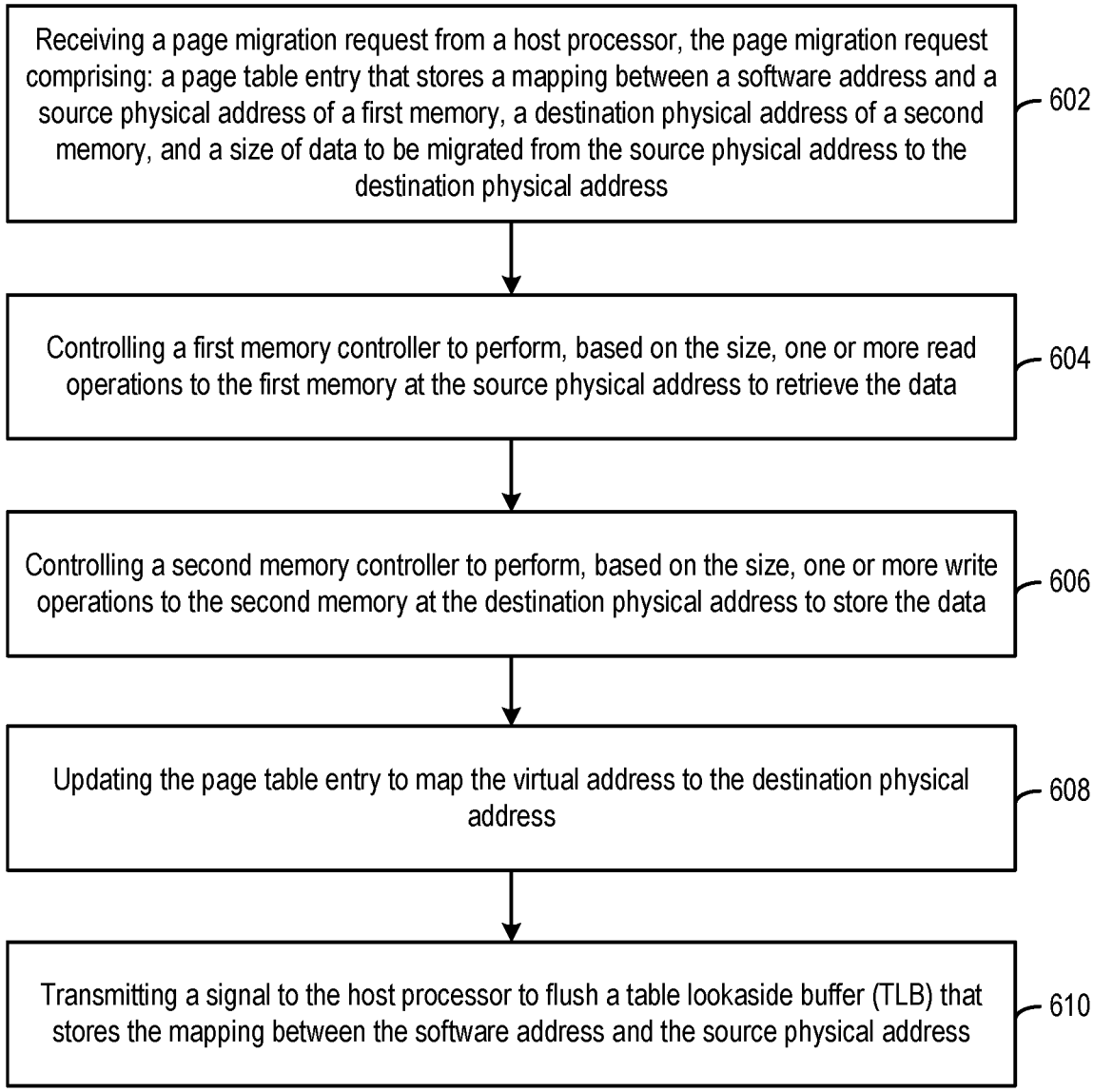
FIG. 6 illustrates an example method to perform data migration.

FIG. 6 illustrates a flowchart of a method 600 performed by various components of memory migration agent 202. Method 600 starts with step 602, in which request parser 302 receives a page migration request from a host processor (e.g., host processor 109), the page migration request comprising: a page table entry that stores a mapping between a software address and a source physical address of a first memory, a destination physical address of a second memory, and a size of data to be migrated from the source physical address to the destination physical address. The software address may include, for example, a virtual address, an intermediate physical address, or a guest physical address. As illustrated in FIG. 3B, the request (e.g., request 320) may include the parameters for a page migration process which includes a reference 322 to a PTE to be updated for the data migration process, a destination physical address 324 of the destination physical memory page frame, and a data size 326 of a size of the data to be migrated. Reference 322 may include, for example, an address of the PTE in the memory (e.g., first memory 104), a pairing of a physical address and a software address from, respectively, physical address field 172 and virtual address field 174 of the PTE. In a case where request 320 includes the parameters for multiple page migration processes, request 320 may include multiple PTE references 322, multiple destination physical addresses 324, and multiple data sizes 326. Request parser 302 may receive request 320 via interconnect 103, direct communication channel 208, etc., extract the PTE reference, destination physical address, and data size based on a format of the request as shown in FIG. 3B, and provide the extracted page migration parameters to controller 310.

In step 604, copy operation manager 304 can provide the size and the source physical address to a first memory controller (e.g., memory controller 108) to retrieve the data from the first memory. Moreover in step 606, copy operation manager 306 can provide the retrieved data and the destination physical address to a second memory controller (e.g., memory controller 108, a different memory controller, etc.) to store the retrieved data at the second memory. Copy operation manager 304 can receive the size, the source and destination physical addresses, etc., from controller 310 which extract those parameters from the request from request parser 302. The memory access operations to retrieve the data from the first memory and to store the data at the second memory can be direct memory access (DMA) operations.

In step 608, TLB manager 308 can transmit a signal to the host processor to flush a translation lookaside buffer (TLB) that stores the mapping between the virtual address and the source physical address. The signal may include, for example, an invalidation command. The invalidation command can be broadcast over interconnect 103 which can be detected (snooped) by a TLB controller, which can perform the flushing in parallel with the execution of the CPU. In some examples, the signal may also include an interrupt, such as an inter-processor interrupt (IPI).

In step 610, page table manager 306 can update the page table entry. As part of step 608, page table manager 306 can swap the first physical address in the page table entry with the second physical address, and assert the page valid flag of the page table entry. Both the swapping and the assertion of the valid flag can be performed as an atomic operation to synchronize with other operations of host processor 109. Controller 310 can also broadcast a cache maintenance command on the interconnect, which can be detected/snooped by a data cache controller, which can then invalidate the cache line of a data cache that stores the migrated data.

Figure 7:
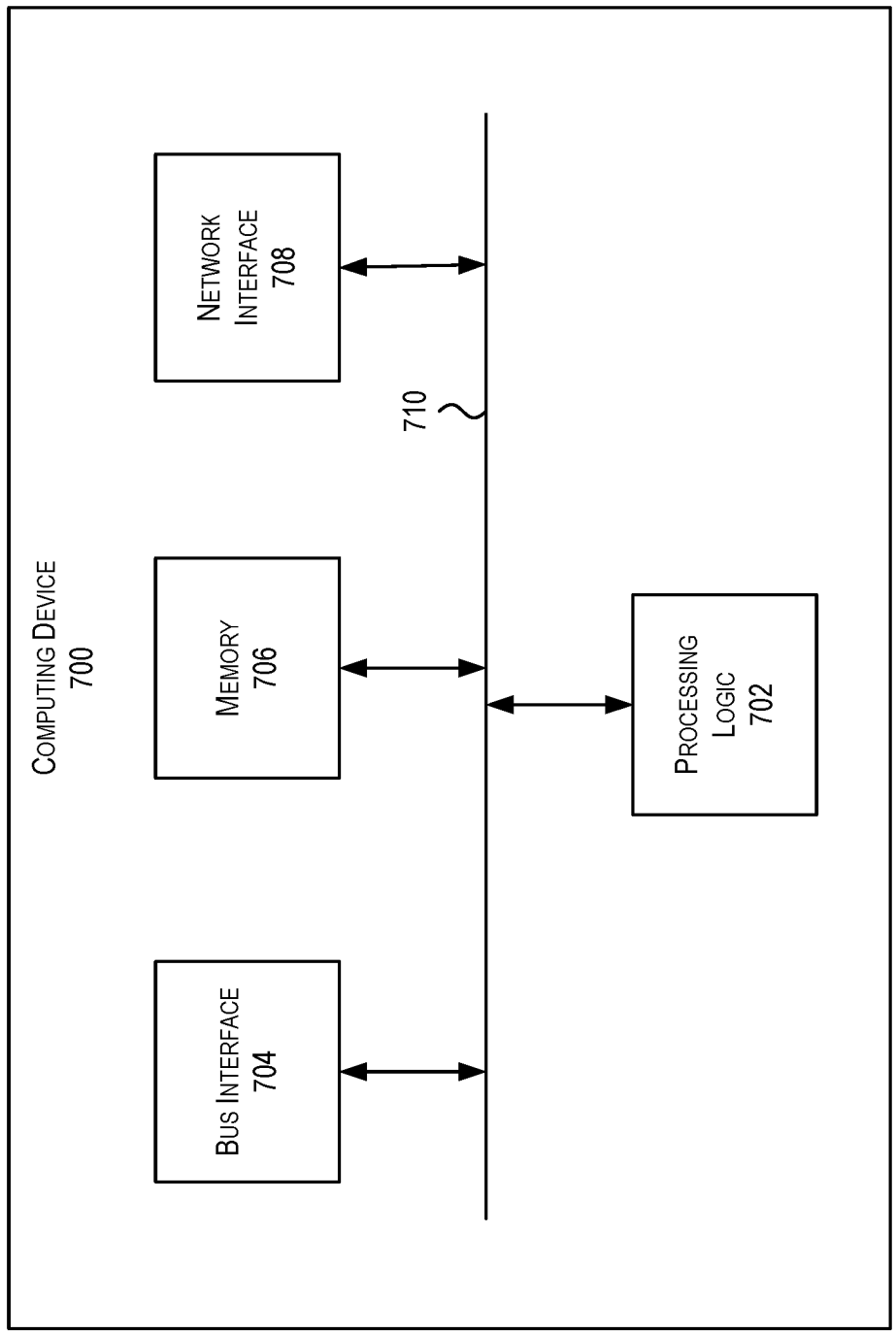
FIG. 7 illustrates an example of a computing device, according to certain aspects of the disclosure.

FIG. 7 illustrates an example of a computing device 700. Functionality and/or several components of the computing device 700 may be used without limitation with other embodiments disclosed elsewhere in this disclosure, without limitations. The computing device 700 may perform computations to facilitate processing of a task. As an illustrative example, the computing device 700 can be part of a server in a multi-tenant compute service system, e.g., the system 100.

In one example, the computing device 700 may include processing logic 702, a bus interface 704, memory 706, and a network interface 708. These components may be hardware modules, software modules, or a combination of hardware and software. In certain instances, components may be interchangeably used with modules or engines, without deviating from the scope of the disclosure. The computing device 700 may include additional components, not illustrated here. In some implementations, the computing device 700 may include fewer components. In some implementations, one or more of the components may be combined into one module. One or more of the components may be in communication with each other over a communication channel 710. The communication channel 710 may include one or more busses, meshes, matrices, fabrics, a combination of these communication channels, or some other suitable communication channel.

The processing logic 702 may include one or more integrated circuits, which may include application specific integrated circuits (ASICs), field programmable gate arrays (FPGAs), systems-on-chip (SoCs), network processing units (NPUs), processors configured to execute instructions or any other circuitry configured to perform logical arithmetic and floating point operations. Examples of processors that may be included in the processing logic 702 may include processors developed by ARM®, MIPS®, AMD®, Intel®, Qualcomm, and the like. In certain implementations, processors may include multiple processing cores, wherein each processing core may be configured to execute instructions independently of the other processing cores. Furthermore, in certain implementations, each processor or processing core may implement multiple processing threads executing instructions on the same processor or processing core, while maintaining logical separation between the multiple processing threads. Such processing threads executing on the processor or processing core may be exposed to software as separate logical processors or processing cores. In some implementations, multiple processors, processing cores or processing threads executing on the same core may share certain resources, such as for example busses, level 1 (L1) caches, and/or level 2 (L2) caches. The instructions executed by the processing logic 702 may be stored on a computer-readable storage medium, for example, in the form of a computer program. The computer-readable storage medium may be non-transitory. In some cases, the computer-readable medium may be part of the memory 706. The processing logic 702 may include functionalities similar to memory migration agent 202, as discussed with reference to FIG. 2-FIG. 5 to facilitate data migration, according to different examples of the disclosed technologies.

The memory 706 may include either volatile or non-volatile, or both volatile and non-volatile types of memory. The memory 706 may, for example, include random access memory (RAM), read only memory (ROM), Electrically Erasable Programmable Read-Only Memory (EEPROM), flash memory, and/or some other suitable storage media. In some cases, some or all of the memory 706 may be internal to the computing device 700, while in other cases some or all of the memory may be external to the computing device 700. The memory 706 may store an operating system comprising executable instructions that, when executed by the processing logic 702, provides the execution environment for executing instructions providing functionality for the computing device 700. The memory 706 may also store modules stored in the memory 504 or other components of memory migration agent 202. In a case where processing logic 702 is in the form of FPGA, memory 706 may store netlists data representing various logic circuit components of processing logic 702.

The bus interface 704 may enable communication with external entities, such as a host device and/or other components in a computing system over an external communication medium. The bus interface 704 may include a physical interface for connecting to a cable, socket, port, or other connection to the external communication medium. The bus interface 704 may further include hardware and/or software to manage incoming and outgoing transactions. The bus interface 704 may implement a local bus protocol, such as Peripheral Component Interconnect (PCI) based protocols, Non-Volatile Memory Express (NVMe), Advanced Host Controller Interface (AHCI), Small Computer System Interface (SCSI), Serial Attached SCSI (SAS), Serial AT Attachment (SATA), Parallel ATA (PATA), some other standard bus protocol, or a proprietary bus protocol. The bus interface 704 may include the physical layer for any of these bus protocols, including a connector, power management, and error handling, among other things. In some implementations, the computing device 700 may include multiple bus interface modules for communicating with multiple external entities. These multiple bus interface modules may implement the same local bus protocol, different local bus protocols, or a combination of the same and different bus protocols.

The network interface 708 may include hardware and/or software for communicating with a network. This network interface 708 may, for example, include physical connectors or physical ports for wired connection to a network, and/or antennas for wireless communication to a network. The network interface 708 may further include hardware and/or software configured to implement a network protocol stack. The network interface 708 may communicate with the network using a network protocol, such as for example TCP/IP, Infiniband, RoCE, Institute of Electrical and Electronics Engineers (IEEE) 802.11 wireless protocols, User Datagram Protocol (UDP), Asynchronous Transfer Mode (ATM), token ring, frame relay, High Level Data Link Control (HDLC), Fiber Distributed Data Interface (FDDI), and/or Point-to-Point Protocol (PPP), among others. In some implementations, the computing device 700 may include multiple network interface modules, each configured to communicate with a different network. For example, in these implementations, the computing device 700 may include a network interface module for communicating with a wired Ethernet network, a wireless 802.11 network, a cellular network, an Infiniband network, etc. In some embodiments, computing device 700 may receive a set of parameters, such as the aforementioned weight vectors for generation of forget gate factor, input factor, output factor, etc. from a server through network interface 708.

The various components and modules of the computing device 700, described above, may be implemented as discrete components, as a System on a Chip (SoC), as an ASIC, as an NPU, as an FPGA, or any combination thereof. In some embodiments, the SoC or other component may be communicatively coupled to another computing system to provide various services such as traffic monitoring, traffic shaping, computing, etc. In some embodiments of the technology, the SoC or other component may include multiple subsystems as disclosed herein.

Figure 8:
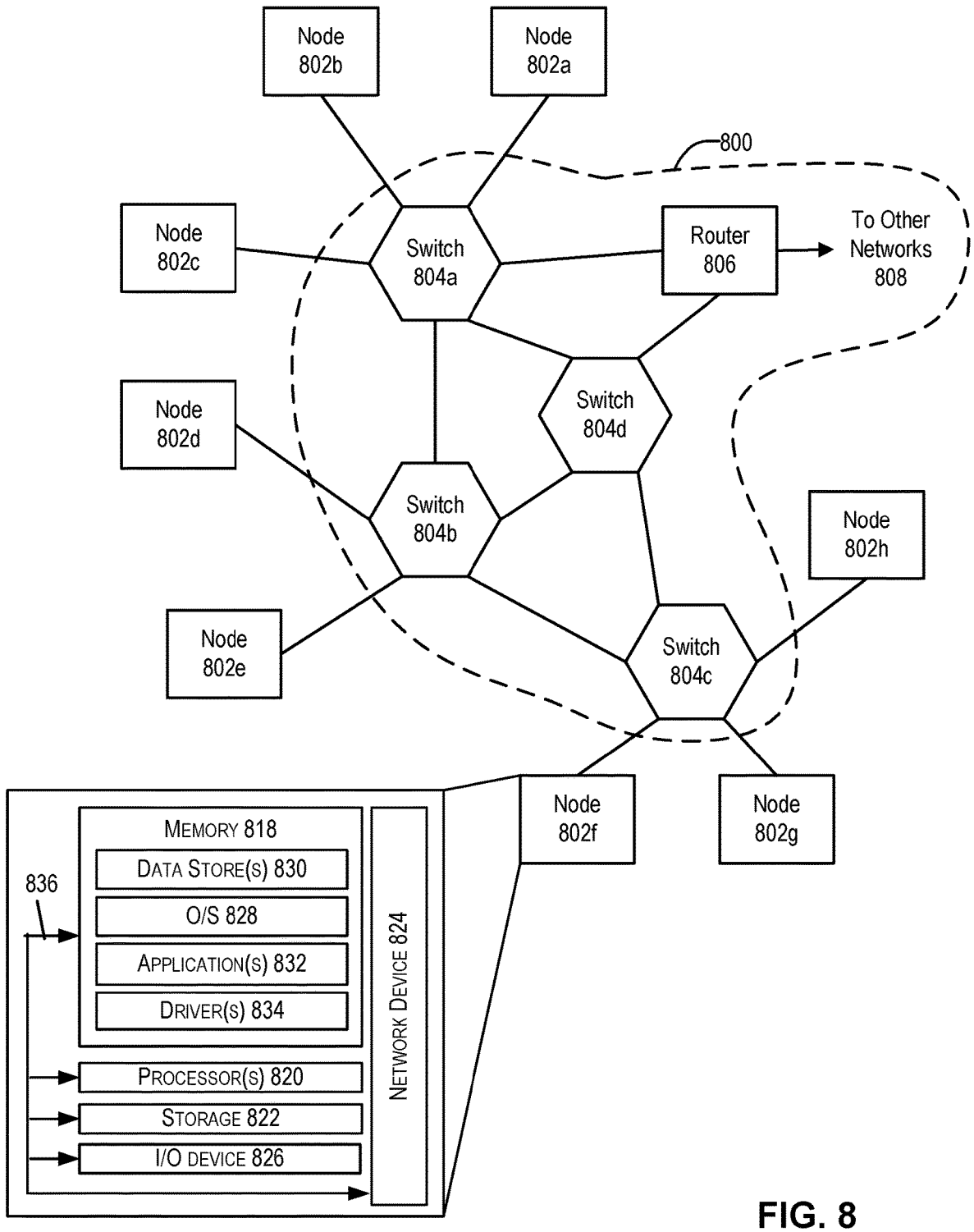
FIG. 8 illustrates an example architecture for features and systems described herein that include one or more service provider computers and/or a user device connected via one or more networks, according to certain aspects of the disclosure.

FIG. 8 illustrates a network 800, illustrating various different types of devices such as the computing device 700 of FIG. 7. In certain embodiments, the network 800 may be based on a switched architecture with point-to-point links. As illustrated in FIG. 8, the network 800 includes a plurality of switches 804a-804d, which may be arranged in a network. In some cases, the switches are arranged in a multi-layered network, such as a Clos network. A network device that filters and forwards packets between local area network (LAN) segments may be referred to as a switch. Switches generally operate at the data link layer (layer 2) and sometimes the network layer (layer 3) of the Open System Interconnect (OSI) Reference Model and may support several packet protocols. Switches 804a-804d may be connected to a plurality of nodes 802a-802h and provide multiple paths between any two nodes.

The network 800 may also include one or more network devices for connection with other networks 808, such as other subnets, LANs, wide area networks (WANs), or the Internet, and may be referred to as routers 806. Routers use headers and forwarding tables to determine the best path for forwarding the packets, and use protocols such as internet control message protocol (ICMP) to communicate with each other and configure the best route between any two devices.

In some examples, network(s) 800 may include any one or a combination of many different types of networks, such as cable networks, the Internet, wireless networks, cellular networks and other private and/or public networks. Interconnected switches 804a-804d and router 806, if present, may be referred to as a switch fabric, a fabric, a network fabric, or simply a network. In the context of a computer network, terms "fabric" and "network" may be used interchangeably herein.

Nodes 802a-802h may be any combination of host systems, processor nodes, storage subsystems, and I/O chassis that represent user devices, service provider computers or third party computers. One or more nodes 802a-802h may include functionalities of the host device 102 and the memory migration agent 202.

User devices may include computing devices to access an application 832 (e.g., a web browser or mobile device application). In some aspects, the application 832 may be hosted, managed, and/or provided by a computing resources service or service provider. The application 832 may allow the user(s) to interact with the service provider computer(s) to, for example, access web content (e.g., web pages, music, video, etc.). The user device(s) may be a computing device such as for example a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device(s) may be in communication with the service provider computer(s) via the other network(s) 808. Additionally, the user device(s) may be part of the distributed system managed by, controlled by, or otherwise part of the service provider computer(s) (e.g., a console device integrated with the service provider computers).

The node(s) of FIG. 8 may also represent one or more service provider computers. One or more service provider computers may provide a native application that is configured to run on the user devices, which user(s) may interact with. The service provider computer(s) may, in some examples, provide computing resources such as, but not limited to, client entities, low latency data storage, durable data storage, data access, management, virtualization, cloud-based software solutions, electronic content performance management, and so on. The service provider computer(s) may also be operable to provide web hosting, databasing, computer application development and/or implementation platforms, combinations of the foregoing or the like to the user(s). In some embodiments, the service provider computer(s) may be provided as one or more virtual machines implemented in a hosted computing environment. The hosted computing environment may include one or more rapidly provisioned and released computing resources. These computing resources may include computing, networking and/or storage devices. A hosted computing environment may also be referred to as a cloud computing environment. The service provider computer(s) may include one or more servers, perhaps arranged in a cluster, as a server farm, or as individual servers not associated with one another and may host the application 832 and/or cloud-based software services. These servers may be configured as part of an integrated, distributed computing environment. In some aspects, the service provider computer(s) may, additionally or alternatively, include computing devices such as for example a mobile phone, a smart phone, a personal digital assistant (PDA), a laptop computer, a desktop computer, a netbook computer, a server computer, a thin-client device, a tablet computer, a gaming console, etc. In some instances, the service provider computer(s), may communicate with one or more third party computers.

In one example configuration, the node(s) 802*a*-802*h* may include at least one memory 818 and one or more processing units (or processor(s) 820). The processor(s) 820 may be implemented in hardware, computer-executable instructions, firmware, or combinations thereof. Computer-executable instruction or firmware implementations of the processor(s) 820 may include computer-executable or machine-executable instructions written in any suitable programming language to perform the various functions described.

In some instances, the hardware processor(s) 820 may be a single core processor or a multi-core processor. A multi-core processor may include multiple processing units within the same processor. In some embodiments, the multi-core processors may share certain resources, such as buses and second or third level caches. In some instances, each core in a single or multi-core processor may also include multiple executing logical processors (or executing threads). In such a core (e.g., those with multiple logical processors), several stages of the execution pipeline and also lower level caches may also be shared.

The memory 818 may store program instructions that are loadable and executable on the processor(s) 820, as well as data generated during the execution of these programs. Depending on the configuration and type of the node(s) 802*a*-802*h*, the memory 818 may be volatile (such as RAM) and/or non-volatile (such as ROM, flash memory, etc.). The memory 818 may include an operating system 828, one or more data stores 830, one or more application programs 832, one or more drivers 834, and/or services for implementing the features disclosed herein.

The operating system 828 may support nodes 802*a*-802*h* basic functions, such as scheduling tasks, executing applications, and/or controller peripheral devices. In some implementations, a service provider computer may host one or more virtual machines. In these implementations, each virtual machine may be configured to execute its own operating system. Examples of operating systems include Unix, Linux, Windows, Mac OS, iOS, Android, and the like. The operating system 828 may also be a proprietary operating system.

The data stores 830 may include permanent or transitory data used and/or operated on by the operating system 828, application programs 832, or drivers 834. Examples of such data include web pages, video data, audio data, images, user data, and so on. The information in the data stores 830 may, in some implementations, be provided over the network(s) 808 to user devices 804. In some cases, the data stores 830 may additionally or alternatively include stored application programs and/or drivers. Alternatively or additionally, the data stores 830 may store standard and/or proprietary software libraries, and/or standard and/or proprietary application user interface (API) libraries. Information stored in the data stores 830 may be machine-readable object code, source code, interpreted code, or intermediate code.

The drivers 834 include programs that may provide communication between components in a node. For example, some drivers 834 may provide communication between the operating system 828 and additional storage 822, network device 824, and/or I/O device 826. Alternatively or additionally, some drivers 834 may provide communication between application programs 832 and the operating system 828, and/or application programs 832 and peripheral devices accessible to the service provider computer. In many cases, the drivers 834 may include drivers that provide well-understood functionality (e.g., printer drivers, display drivers, hard disk drivers, Solid State Device drivers). In other cases, the drivers 834 may provide proprietary or specialized functionality.

The service provider computer(s) or servers may also include additional storage 822, which may include removable storage and/or non-removable storage. The additional storage 822 may include magnetic storage, optical disks, solid state disks, flash memory, and/or tape storage. The additional storage 822 may be housed in the same chassis as the node(s) 802*a*-802*h* or may be in an external enclosure. The memory 818 and/or additional storage 822 and their associated computer-readable media may provide non-volatile storage of computer-readable instructions, data structures, program modules, and other data for the computing devices. In some implementations, the memory 818 may include multiple different types of memory, such as SRAM, DRAM, or ROM.

The memory 818 and the additional storage 822, both removable and non-removable, are examples of computer-readable storage media. For example, computer-readable storage media may include volatile or non-volatile, removable or non-removable media implemented in a method or technology for storage of information, the information including, for example, computer-readable instructions, data structures, program modules, or other data. The memory 818 and the additional storage 822 are examples of computer storage media. Additional types of computer storage media that may be present in the node(s) 802a-802h may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, solid state drives, or some other medium which can be used to store the desired information and which can be accessed by the node(s) 802a-802h. Computer-readable media also includes combinations of any of the above media types, including multiple units of one media type.

Alternatively or additionally, computer-readable communication media may include computer-readable instructions, program modules or other data transmitted within a data signal, such as a carrier wave or other transmission. However, as used herein, computer-readable storage media does not include computer-readable communication media.

The node(s) 802a-802h may also include I/O device(s) 826, such as a keyboard, a mouse, a pen, a voice input device, a touch input device, a display, speakers, a printer, and the like. The node(s) 802a-802h may also include one or more communication channels 836. A communication channel 836 may provide a medium over which the various components of the node(s) 802a-802h can communicate. The communication channel or channels 836 may take the form of a bus, a ring, a switching fabric, or a network.

The node(s) 802a-802h may also contain network device(s) 824 that allow the node(s) 802a-802h to communicate with a stored database, another computing device or server, user terminals and/or other devices on the network(s) 800.

In some implementations, the network device 824 is a peripheral device, such as a PCI-based device. In these implementations, the network device 824 includes a PCI interface for communicating with a host device. The term "PCI" or "PCI-based" may be used to describe any protocol in the PCI family of bus protocols, including the original PCI standard, PCI-X, Accelerated Graphics Port (AGP), and PCI-Express (PCIe) or any other improvement or derived protocols that are based on the PCI protocols discussed herein. The PCI-based protocols are standard bus protocols for connecting devices, such as a local peripheral device to a host device. A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using Non-Volatile Memory Express (NVMe). NVMe is a device interface specification for accessing non-volatile storage media attached to a computing system using PCIe. For example, the bus interface module 704 may implement NVMe, and the network device 824 may be connected to a computing system using a PCIe interface. In some implementations, the network device 824 may include single-root I/O virtualization (SR-IOV).

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in FIG. 7, FIG. 8, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

In the foregoing description, various embodiments have been described. For purposes of explanation, specific configurations and details have been set forth in order to provide a thorough understanding of the embodiments. However, it will also be apparent to one skilled in the art that the embodiments may be practiced without the specific details.

Furthermore, well-known features may be omitted or simplified in order not to obscure the embodiments being described.

Various embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A memory migration integrated circuit for offloading page migration operations from processing cores of a host processor of a host device, the memory migration integrated circuit comprising:
    a request queue stored in the memory migration integrated circuit; and
    a control circuit configured to:
        receive a plurality of page migration requests being offloaded from the host device on a communication interface of the memory migration integrated circuit that interfaces with the host device, each page migration request comprising: a page table entry that stores a mapping between a software address and a source physical address of a first memory, a destination physical address of a second memory, and a size of data to be migrated from the source physical address to the destination physical address, the software address being an address on which a software application executed by the host processor operates;
        store the plurality of page migration requests together in the request queue;
        retrieve the plurality of page migration requests from the request queue for batch processing;
        for each of the page migration requests:
            invalidate the page table entry;
            control a first memory controller to retrieve the data from the first memory at the source physical address to retrieve the data;
            control a second memory controller to store the data in the second memory at the destination physical address; and
            update the page table entry, wherein the update includes a swapping the source physical address to the destination physical address stored in the page table entry and validating the page table entry, wherein each of the swapping and validating is performed by an atomic operation; and
        perform batch processing of translation lookaside buffer flushes for the plurality of page migration requests.

2. The memory migration integrated circuit of claim 1, wherein the first memory and the second memory comprise different types of memory devices.

3. The memory migration integrated circuit of claim 1, wherein the first memory and the second memory comprise the same type of memory device and have different degrees of wear.

4. The memory migration integrated circuit of claim 1, wherein the memory migration integrated circuit is in the same chip package as the host processor.

5. A memory migration integrated circuit for offloading page migration operations from processing cores of a host processor of a host device, the memory migration integrated circuit being configured to:
    receive, from the host device on a communication interface of the memory migration integrated circuit that interfaces with the host device, a plurality of page migration requests to perform the page migration operations;
    store the plurality of page migration requests together in a queue that is part of the memory migration integrated circuit;
    perform batch processing of the plurality of page migration requests stored in the queue by performing a page migration operation for each of the plurality of page migration requests, the page migration operation comprising:
        performing a copy operation of data from a first physical address to a second physical address, and
        updating a page table entry based on the second physical address, to enable the host device to access the data from the second physical address based on the updated page table entry; and
    perform batch processing of translation lookaside buffer flushes corresponding to the plurality of page migration requests.

6. The memory migration integrated circuit of claim 5, wherein the plurality of page migration requests comprises a page migration request that includes:
    a reference to the page table entry that stores a mapping between a software address and the first physical address associated with the page migration request;
    the second physical address associated with the page migration request; and
    a size of the data associated with the page migration request; and
    wherein the page table entry is stored in a first memory coupled with both the host processor and the memory migration integrated circuit via an interconnect.

7. The memory migration integrated circuit of claim 6, wherein the software address comprises at least one of: a virtual address, an intermediate physical address, or a guest physical address.

8. The memory migration integrated circuit of claim 6, wherein the memory migration integrated circuit is configured to:
    remove a page migration request from the queue after performing the page migration operation for the page migration request.

9. The memory migration integrated circuit of claim 6, wherein the page migration operation further comprises:
    de-asserting, in a first atomic operation, a valid flag of the page table entry to prevent the host processor from writing to the first physical address; and
    after performing the copy operation of the data from the first physical address to the second physical address, updating the page table entry, the updating comprising:
        asserting, in a second atomic operation, the valid flag of the page table entry, and
        swapping, in a third atomic operation, the first physical address with the second physical address.

10. The memory migration integrated circuit of claim 6, wherein the page migration operation further comprises:

de-asserting, in a first atomic operation, a dirty flag of the page table entry, the dirty flag indicating whether the first physical address stored in the page table entry receives a write operation from the host processor; and after performing the copy operation of the data from the first physical address to the second physical address:
determining whether the dirty flag of the page table entry is asserted; and
performing a second operation based on whether the dirty flag is asserted.

11. The memory migration integrated circuit of claim 10, wherein the page migration operation further comprises:
based on the dirty flag remaining de-asserted after the copy operation is performed:
swapping, in a second atomic operation, the first physical address with the second physical address in the page table entry to map the software address to the second physical address.

12. The memory migration integrated circuit of claim 10, wherein the copy operation is a first copy operation; and
wherein the second operation comprises, based on the dirty flag being asserted after the first copy operation is performed:
de-asserting, in a second atomic operation, a dirty flag of the page table entry;
performing a second copy operation of the data from the first physical address to the second physical address;
determining whether the dirty flag of the page table entry remains de-asserted; and
based on the dirty flag remaining de-asserted after the second copy operation is performed:
swapping, in a third atomic operation, the first physical address with the second physical address in the page table entry to map the software address to the second physical address.

13. The memory migration integrated circuit of claim 12, wherein the second copy operation is performed after a time-out period from the first copy operation expires.

14. The memory migration integrated circuit of claim 10, wherein the page migration operation is a first page migration operation; and
wherein the second operation comprises, based on the dirty flag being asserted, foregoing the first page migration operation and processing a second page migration request to perform a second page migration operation from the host processor.

15. The memory migration integrated circuit of claim 5, wherein:
the first physical address associated with a page migration request is of a first memory; and
the second physical address associated with the page migration request is of a second memory.

16. The memory migration integrated circuit of claim 5, further comprising: a request parser, a copy operation manager, a page table manager, and a translation lookaside buffer (TLB) manager;
wherein the request parser is configured to receive a page migration request from the plurality of page migration requests and extract parameters including a data size of the page migration operation from the page migration request;
wherein the copy operation manager is configured to perform the copy operation of the data;
wherein the page table manager is configured to update the page table entry; and
wherein the TLB manager is configured to transmit a signal to the host processor to update a TLB that stores mapping between a software address and the first physical address.

17. The memory migration integrated circuit of claim 16, further comprising: a controller to control a sequence of the copy operation performed by the copy operation manager, and the update of the page table entry performed by the page table manager.

18. A method of offloading page migration operations from processing cores of a host processor of a host device, the method being performed by a memory migration integrated circuit and comprising:
receiving a plurality of page migration requests from the host device on a communication interface of the memory migration integrated circuit that interfaces with the host device, each page migration request comprising: a page table entry that stores a mapping between a software address and a source physical address of a first memory, a destination physical address of a second memory, and a size of data to be migrated from the source physical address to the destination physical address;
storing the plurality of page migration requests together in a queue that is part of the memory migration integrated circuit;
performing batch processing of the plurality of page migration requests stored in the queue by performing, for each page migration request:
providing the size and the source physical address to a first memory controller to retrieve the data from the first memory;
providing the data and the destination physical address to a second memory controller to store the data at the second memory; and
updating the page table entry to map the software address to the destination physical address; and
performing batch processing of translation lookaside buffer flushes for the plurality of page migration requests.

19. The method of claim 18,
wherein the batch processing of the plurality of page migration requests is initiated after a number of page migration requests in the queue has reached a threshold.

20. The method of claim 18,
wherein the batch processing of the plurality of page migration requests is initiated when the first memory and the second memory are idle.

* * * * *